(12) United States Patent
Byer et al.

(10) Patent No.: US 8,711,416 B1
(45) Date of Patent: Apr. 29, 2014

(54) SERVER PROVIDING PSEUDO PRINT PREVIEW AND FINAL REGULAR PREVIEW TO DEVICE

(75) Inventors: Scott Byer, Cupertino, CA (US); Yevgeniy Gutnik, Cupertino, CA (US); Tyler Odean, San Francisco, CA (US); Yuri Dolgov, Mountain View, CA (US); Sanjeev Radhakrishnan, San Jose, CA (US); Paolo Ferraris, Mountain View, CA (US); Marc Pawliger, San Jose, CA (US); Abhijit Kalamkar, Sunnyvale, CA (US); Robert Toscano, San Francisco, CA (US); Albert Bodenhamer, San Jose, CA (US); Akshay Kannan, Fremont, CA (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 13/563,276

(22) Filed: Jul. 31, 2012

(51) Int. Cl.
*G06F 17/21* (2006.01)
(52) U.S. Cl.
USPC .......................................... 358/1.15; 715/274
(58) Field of Classification Search
CPC ...................................................... G06F 17/212
USPC ........................................ 358/1.15; 715/274
See application file for complete search history.

(56) References Cited

U.S. PATENT DOCUMENTS

| | | | |
|---|---|---|---|
| 5,828,864 A | 10/1998 | Danknick et al. | |
| 6,453,129 B1 | 9/2002 | Simpson et al. | |
| 7,092,119 B1 | 8/2006 | Hinds et al. | |
| 7,411,690 B2 | 8/2008 | Tsukada | |
| 2004/0114175 A1 | 6/2004 | Cherry et al. | |
| 2005/0158100 A1 | 7/2005 | Yamaguchi | |
| 2006/0095500 A1 | 5/2006 | Kato | |
| 2006/0158680 A1 | 7/2006 | Fujinawa et al. | |
| 2007/0086054 A1 | 4/2007 | Ikeno | |
| 2007/0159650 A1 | 7/2007 | Takamatsu et al. | |
| 2007/0253020 A1 | 11/2007 | Hull et al. | |
| 2008/0137121 A1 | 6/2008 | Chrisop et al. | |
| 2009/0276266 A1 | 11/2009 | Nishiyama | |

(Continued)

FOREIGN PATENT DOCUMENTS

| | | |
|---|---|---|
| EP | 1465052 A2 | 10/2004 |
| WO | 2011115987 A2 | 9/2011 |

OTHER PUBLICATIONS

"Server Message Block", from Wikipedia, the free encyclopedia, Aug. 24, 2012, 9 pages.

(Continued)

*Primary Examiner* — Eric A Rust
(74) *Attorney, Agent, or Firm* — Brake Hughes Bellermann LLP

(57) ABSTRACT

The embodiments provide a print server including an application manager configured to receive, over a network, a print request for content to be printed in accordance with at least one selected printing option from an application associated with a device, and configured to provide a print dialog, over the network, to a user of the application in response to the print request, a pseudo preview generator configured to provide a pseudo print preview for display within the print dialog while a print preview is being generated, and a print preview generator configured to access the content in response to the print request and generate the print preview providing the at least a portion of the content displayed in accordance with at least one selected printing option, and further configured to transmit the print preview, over the network, for display within the print dialog thereby replacing the pseudo print preview.

20 Claims, 11 Drawing Sheets

(56) References Cited

U.S. PATENT DOCUMENTS

| | | | |
|---|---|---|---|
| 2010/0302579 A1 | 12/2010 | Nuggehalli et al. | |
| 2010/0309508 A1 | 12/2010 | Kamath et al. | |
| 2010/0328707 A1 | 12/2010 | Miyake | |
| 2011/0075164 A1 | 3/2011 | Nordback | |
| 2011/0096354 A1 | 4/2011 | Liu | |
| 2011/0222104 A1 | 9/2011 | Mohammad et al. | |
| 2011/0235085 A1 | 9/2011 | Jazayeri et al. | |
| 2011/0242554 A1 | 10/2011 | Farry et al. | |
| 2011/0299110 A1 | 12/2011 | Jazayeri | |
| 2012/0057193 A1 | 3/2012 | Jazayeri | |
| 2013/0188218 A1* | 7/2013 | Rajesh | 358/1.15 |

OTHER PUBLICATIONS

"CUPS", from Wikipedia, the free encyclopedia, Aug. 22, 2012, 10 pages.

"HP and RIM Announce Strategic Alliance to Mobilize Business on BlackBerry", Hewlett-Packard Development Company, L.P., May 4, 2009, 3 pages.

Ray, "HP Cloud Print: 100% and Absolutely Revolutionary", Aug. 21, 2007, 3 pages.

"Introducing ePrint", ePrintCenter, Hewlett-Packard Development Company, L.P., 2012, 1 page.

Internet Printing Protocol. from Wikipedia, Dec. 29, 2011, 3 pages.

"Print Server", from Wikipedia, the free encyclopedia, Jul. 31, 2012, 2 pages.

Search Report and Written Opinion for International Application No. PCT/US2011/028512, mailed Jun. 9, 2011, 13 pages.

Bhatti, et al., "Cloud-Based Printing for Mobile Devices", Proceedings of the SPIE, vol. 7540, 2010, pp. 75400A-75400A-8.

Non-Final Office Action for U.S. Appl. No. 12/725,067, mailed Sep. 27, 2012, 17 pages.

* cited by examiner

Long edge option selection

Orientation Selection

SERVER PROVIDING PSEUDO PRINT PREVIEW AND FINAL REGULAR PREVIEW TO DEVICE

TECHNICAL FIELD

This description relates to printing.

BACKGROUND

An ability to print within a computing environment generally ranges from desirable to indispensable. Conventional printers, and associated printing techniques, typically involve installation of a print driver within the context of an operating system or platform of an associated computer. The print driver is generally specific to the associated (type of) printer, and to the operating system, and enables applications running in the context of the operating system to communicate with (e.g., send print jobs to) the printer. Thus, in an example user experience, an owner of a computer running a particular operating system purchases a printer, and then installs a version of the printer driver associated with the user's operating system onto the computer. In other example scenarios, a printer (i.e., associated printer driver) may be installed in the context of a network.

In either case, a user may wish to preview a document before communicating the print job to the printer. For example, an application running on the operating system may provide a print preview in a print dialog that displays a representation of the document in response to a user selecting "print" from a menu selection. In the conventional print context, the application has direct access to the document for creating the print preview. In other words, all data necessary for the generation of the print preview may be accessed locally. As such, the application may provide an actual print preview of the document subject relatively quickly and easily after the user selects the "print" option.

In addition, most recently, printing a document using a cloud print service is now a possibility. For example, a cloud printing system may provide users with an ability to print content from virtually any application or device, using any cloud-aware printer. In other words, the cloud printing system may provide an ability for virtually any application running on any device within a network to communicate with a cloud print service, to thereby print to any printer that is also in communication with the cloud print service. In one example, in the context of cloud printing, an application may send a print request, over a network, to the cloud print server for printing a document using the cloud print service. In return, the cloud print server may provide a print dialog including a number of available cloud-printers, as well as printing options associated with each available cloud-aware printer. Upon selection of a printer and the print options, the cloud print service may convert the print job to a format suitable for the cloud-aware printer, and then transmit the print job having the converted format, over the network, to the cloud aware printer. However, rendering a suitable print preview in the cloud environment presents its own set of challenges that are not encountered in conventional print paradigms.

In addition, with respect to conventional printing mechanisms, the print dialog may include not only the print preview but also a number of selectable printing options such as two-sided/one-sided printing, page orientation and resolution, for example. These printing options are sometimes presented side-by-side with the print preview, or alternatively, using drop down menu selections on the print dialog. Generally, the user may interface with these printing options by "checking" a box or operating a set of radio or option buttons (e.g., a set of circular holes that contain white space (unselected) or a dot (selected)). However, conventional user interface elements for selecting printing options are sometimes not user-friendly or intuitive for printing a document in a manner which the user desires.

SUMMARY

The details of one or more implementations are set forth in the accompanying drawings and the description below. Other features will be apparent from the description and drawings, and from the claims.

The embodiments provide a print server including an application manager configured to receive, over a network, a print request for content to be printed in accordance with at least one selected printing option from an application associated with a device, and configured to provide a print dialog, over the network, to a user of the application in response to the print request. The print dialog identifies at least one printer and provides the at least one selected printing option. The print server also includes a pseudo preview generator configured to provide a pseudo print preview for display within the print dialog while a print preview is being generated, where the pseudo print preview provides a generic representation of at least a portion of the content displayed in accordance with the at least one selected printing option. Also, the print server includes a print preview generator configured to access the content in response to the print request and generate the print preview providing the at least a portion of the content displayed in accordance with the at least one selected printing option, and further configured to transmit the print preview, over the network, for display within the print dialog thereby replacing the pseudo print preview.

The print preview generator configured to access the content may include receiving the content, over the network, from the application in response to the print request. According to another embodiment, the print preview generator configured to access the content may include retrieving the content from a network server in response to the print request.

The print preview generator configured to generate the print preview may include arranging the at least a portion of the content in accordance with the at least one selected printing option below the at least one selected printing option.

The print preview generator may be further configured to receive option adjustment information, over the network, from the application. The option adjustment information may indicate an adjustment to the at least one selected printing option, and the preview generator configured to generate the print preview may include providing the at least a portion of the content displayed in accordance with the adjusted at least one selected printing option.

The print preview generator further includes a content storage configured to store previous print previews, and the print preview generator configured to generate the print preview may include determining that the print preview according to the adjusted at least one selected printing option is stored in the content storage and selecting the stored preview print preview having the adjusted at least one selected printing option.

According to another embodiment, the print preview generator further includes a content storage configured to store previous print previews, and the print preview generator configured to generate the print preview may include determining that the print preview according to the adjusted at least one selected printing option is not stored in the content storage and generating the print preview based on the at least a portion of the content and the adjusted at least one selected printing option.

The pseudo print preview may display information indicating that the print preview is being generated. In response to receipt of an adjustment of the at least one selected printing option, the pseudo preview generator configured to provide the pseudo print preview may include replacing the print preview with the pseudo print preview and providing the pseudo print preview until the print preview having the adjusted at least one selected printing option is available.

The embodiments also provide a method for providing a print preview performed by at least one processor. The method includes receiving, over a network, a print request for content to be printed in accordance with at least one selected printing option from an application associated with a device, and providing a print dialog, over the network, to a user of the application in response to the print request. The print dialog identifies at least one printer and provides the at least one selected printing option. The method further includes providing a pseudo print preview for display within the print dialog while a print preview is being generated. The pseudo print preview provides a generic representation of at least a portion of the content displayed in accordance with the at least one selected printing option. Also, the method includes accessing the content in response to the print request, generating the print preview providing the at least a portion of the content displayed in accordance with the at least one selected printing option, and transmitting the print preview, over the network, for display within the print dialog thereby replacing the pseudo print preview.

The assessing the content in response to the print request may include receiving the content, over the network, from the application in response to the print request. According to another embodiment, the accessing the content in response to the print request may include retrieving the content from a network server in response to the print request.

The generating the print preview may include arranging the at least a portion of the content in accordance with the at least one selected printing option below the at least one selected printing option.

The method may further include receiving option adjustment information, over the network, from the application, where the option adjustment information may indicate an adjustment to the at least one selected printing option, and generating the print preview including providing the at least a portion of the content displayed in accordance with the adjusted at least one selected printing option.

The generating the print preview may include determining that the print preview according to the adjusted at least one selected printing option is stored in a content storage that stores previously generated print previews and selecting the stored preview print preview having the adjusted at least one selected printing option.

The generating the print preview may include determining that the print preview according to the adjusted at least one selected printing option is not stored in a content storage that stores previously generated print previews and generating the print preview based on the at least a portion of the content and the adjusted at least one selected printing option.

The embodiments may provide a non-transitory computer-readable medium storing instructions that when executed cause one or more processors to perform a print preview generation process. The instructions may comprise instructions to receive, over a network, a print request for content to be printed in accordance with at least one selected printing option from an application associated with a device, and provide a print dialog, over the network, to a user of the application in response to the print request. The print dialog identifies at least one printer and provides the at least one selected printing option. The instructions may include instructions to provide a pseudo print preview for display within the print dialog while a print preview is being generated. The pseudo print preview provides a generic representation of at least a portion of the content displayed in accordance with the at least one selected printing option. Also, the instructions may include instructions to access the content in response to the print request, generate the print preview providing the at least a portion of the content displayed in accordance with the at least one selected printing option, and transmit the print preview, over the network, for display within the print dialog thereby replacing the pseudo print preview.

The instructions may include instructions to receive the content, over the network, from the application in response to the print request, and/or receive option adjustment information, over the network, from the application, the option adjustment information indicating an adjustment to the at least one selected printing option, and to generate the print preview including providing the at least a portion of the content displayed in accordance with the adjusted at least one selected printing option.

The instructions may include instructions to determine that the print preview according to the adjusted at least one selected printing option is stored in a content storage that stores previously generated print previews, and select the stored preview print preview having the adjusted at least one selected printing option.

DETAILED DESCRIPTION

Figure 1A:
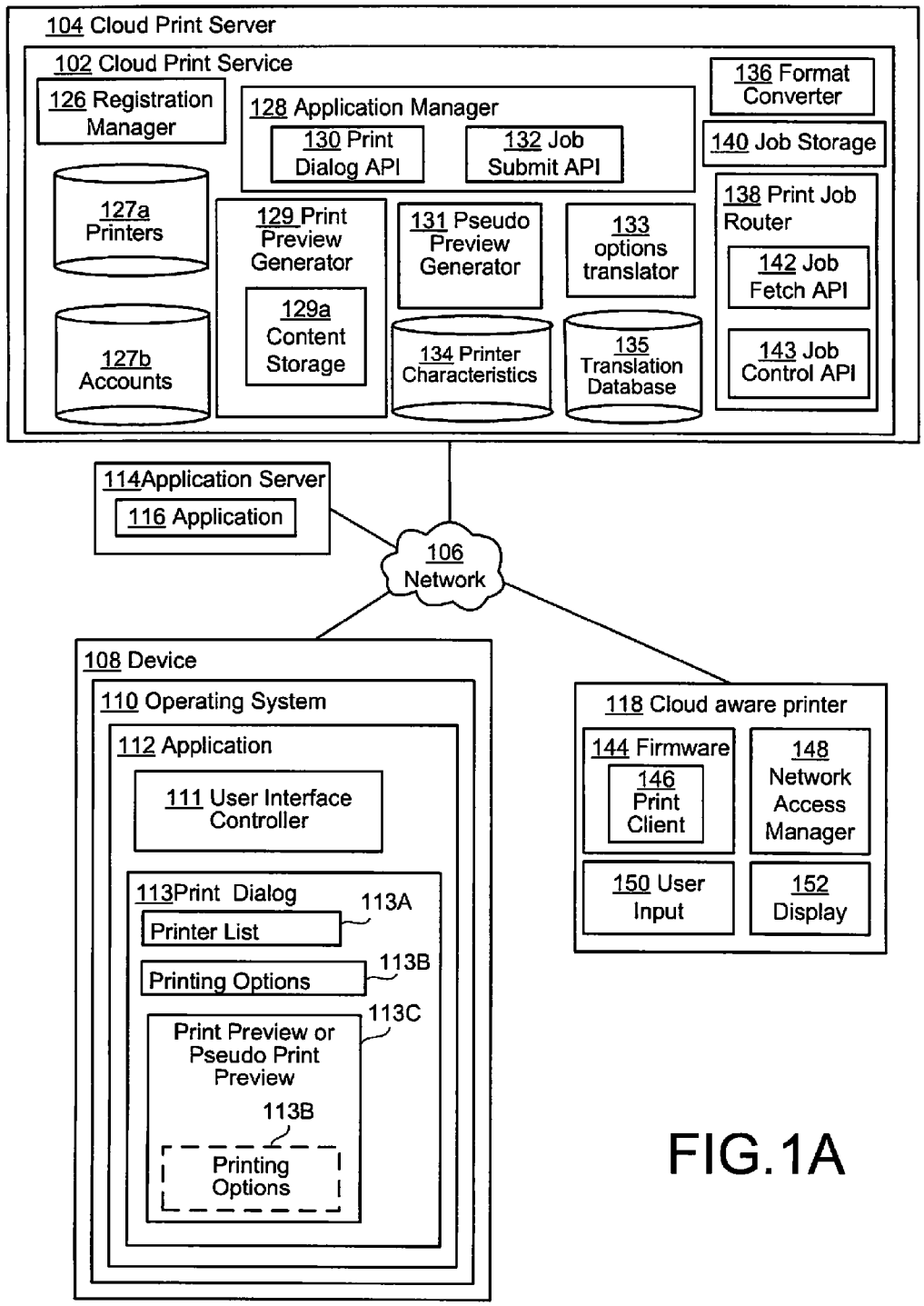
FIG. 1A is a block diagram of a system for generating a print preview according to one or more printing options using a cloud print server and/or controlling a selection of the one or more printing options according to an embodiment.

FIG. 1A is a block diagram of a system for generating a print preview and/or a pseudo print preview according to one or more printing options using a cloud print server and/or controlling a selection of the one or more printing options via the print preview/pseudo print preview according to an embodiment. As shown in the example of FIG. 1, the cloud print service 102 may be executed on a cloud print server 104 which provides printing capabilities over a network 106. As described in detail below, the cloud print service 102 therefore provides a user with a uniform printing experience which is platform-independent and which unburdens the user of the need to configure, update, or otherwise maintain or oversee printer operations. Moreover, as also described herein in further detail, the cloud print server 102 may transmit, over the network 106, a print preview for a document or portion thereof to be printed using the cloud print service 102 in a consistent and reliable manner. In addition, because the cloud print server 102 may not have relatively immediate access to the document subject to the print request (e.g., it is in the process of being uploaded to the cloud print server 102), the cloud print service 102 may provide a pseudo print preview, which may be a generic representation of the document, while the print preview is being generated at the cloud print server 102. The pseudo print preview may be arranged according to one or more selected printing options (e.g., the pseudo print preview having a landscape orientation), and may change as the user changes the printing options (e.g., changing to a portrait orientation). Upon receiving the print preview, the pseudo print preview may be replaced with the received cloud-generated print preview.

Furthermore, the user may select one or more printing options through the displayed content of either the pseudo print preview or the full print preview provided by the cloud print server 102 or any print preview provided by conventional printing paradigms. For example, the user may change printing options by graphically manipulating the print preview/pseudo print preview (e.g., rotating the print preview by a gesture of a user on a display screen or "dragging" a portion of the preview using a pointing device). Various other features and advantages of the cloud print service 102 and the user controls for the print preview are described in detail below, and/or would be apparent.

In FIG. 1, a device 108 is illustrated as an example of virtually any computing device from which a user may wish to execute a print job. By way of non-limiting example, then, the device 108 may include a laptop or desktop computer, a netbook, a tablet computer, a smartphone, a camera, or any device which may store or have access to content which the user may desire to print.

In the example of FIG. 1, an operating system 110 is illustrated as executing an application 112. Again, these elements are included by way of illustration and example, and may include virtually any operating system or other platform on which virtually any application may run. For example, the operating system 110 may include operating systems such as the Windows operating system, Mac OS, or Linux, and may include mobile platforms such as Android, Symbian, or iPhone OS, to name a few examples. In other examples, the operating system 110 may include a browser-based operating system, such as the Chrome OS.

Consequently, the application 112 may include virtually any application which may run on any underlying operating system or platform. Examples of such applications are well-known and too numerous to mention in any detail, but generally include document processing applications, email applications, image editing or presentation software, a web browser, or virtually any application which provides the user with a rendering of data content which the user may wish to print.

In particular, as referenced above, the application 112 may represent a web application which executes on a remote application server 114 as application 116. That is, the application 116 may include any application functionality which is accessed by the user over the network 106 and experienced locally as the application 112, e.g., using a browser running at the device 108. As is known, such web applications allow an owner of the application server 114 to assume responsibility for installing, configuring, executing, and maintaining the application 116 at the application server 114, so that the user of the device 108 may obtain the benefit of the application 116 without many or any of the associated costs and responsibilities. Techniques for executing such a web application, and related technology, are well known in the art and are therefore not described further in detail herein, except as may be helpful or necessary to understand operations of the system of FIG. 1.

The network 106 may thus represent, for example, the public Internet or other wide area public or private network. The network 106 may represent, in further examples, a corporate or other intranet, and/or a smaller-scale, local or personal network, any of which may be implemented using standard network technology.

Further in FIG. 1, a cloud-aware printer 118 is illustrated which is configured to communicate with the cloud print service 102 over the network 106. In this regard, the term "cloud" or "cloud-aware" references the use of "cloud computing," which, generally speaking, includes a style of computing in which computing resources such as application programs and file storage are remotely provided over a network such as the Internet, typically through a web browser. For example, many web browsers are capable of running applications, which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that the application server 114 and associated application 116 may also represent examples of cloud computing. Although only one cloud aware printer 118 is illustrated in FIG. 1, the example embodiments encompass any number of cloud aware printers using the system of FIG. 1.

In the context of the cloud-aware printer 118, the cloud print service 102 enables the application 112 to print directly to the cloud-aware printer 118, without a requirement or need for (e.g., independently of), involvement of the operating system 110. In other words, the application 112 may communicate directly with the cloud print service 102 to thereby print to the cloud-aware printer 118, without e.g., requiring a local driver within the operating system 110. As a result, virtually any application 112 that may be configured to communicate with the cloud print service 118 may make use of the cloud-aware printer 118, as described in detail, below.

For example, the cloud print service 102 may be configured to register the user and/or the device 108, as well as the cloud-aware printer 118, or any other printer capable of using the system of FIG. 1. In a specific example, the device may be a smartphone, and the user may use the application 112 to purchase a ticket (e.g., a movie ticket, or an airline ticket). Then, the user may print the purchased ticket directly to the cloud-aware printer 118, even though the device 108 and/or the operating system 110 may not have the resources, or otherwise be configured, to support native printing in a conventional sense (e.g., may not currently be executing a print driver of any sort associated with the cloud-aware printer 118). In this way, the user of the application 112 may be provided with a print option and associated abilities that are not currently provided in conventional printing paradigms and techniques. Many other such examples are described herein, or would be apparent.

The cloud-aware printer 118 may be contrasted with a legacy printer, not specifically illustrated in FIG. 1, which does not natively support communication with the cloud print service 102. When using such a legacy printer, a separate device and/or software may be utilized to impart the advantages of the cloud print service 120 to the legacy printer. It will be appreciated that all the various features and functions of the cloud-aware printer 118 may be obtained through the use of a legacy printer supplemented with appropriate hardware/software support.

In short, the system provides an ability for virtually any application running on any device within the network 106 (e.g., the applications 112, 116 and device 108) to communicate with the cloud print service 102 to thereby print to any printer which is also in (direct or indirect) communication with the cloud print service 102. Consequently, users may benefit from increased printing options and abilities, and experience an overall decrease in the costs and efforts associated with doing so. Meanwhile, printer manufacturers may experience a decreased or eliminated need to provide users with the (updated) driver(s) and other prerequisites for users to fully experience the benefits of their products. This may result in, for example, higher customer satisfaction, and a decreased cost of producing and maintaining printers.

In particular, as referenced above, the system may provide a number of enhanced features and functions related to print previews and/or user controls for selecting printing options. For example, the application 112 may provide a print dialog 113 in conjunction with the cloud print service 102. The print dialog 113 may include a printer list 113A identifying a number of printers including the cloud aware printer 118, the legacy printer, as well as any other available cloud aware printer that is associated with a user account, as further explained below. Further, the print dialog 113 may include one or more printing options 113B corresponding to each of the printers in the printer list 113A. The print dialog 113 is further illustrated with reference to FIGS. 3A-3E and 4B-4E.

According to the embodiments, the print dialog 113 may also include a print preview 113C (e.g., the print preview generated by the cloud print service 102 or the pseudo print preview). For example, a user may desire to print a document using the application 112. The application 112 may transmit a print request to the cloud print service 102, and in return, the application 112 may receive the print dialog 113 with the printer list 113A, the printing options 113B and the print preview 113C. With respect to the print preview 113C, while the document is being accessed by the cloud print service 102 in order to generate the full print preview, the print dialog 113 may provide the pseudo print preview while the cloud print service 102 is generating the print preview. After the cloud print service 102 has generated the print preview, and the application 112 has received the print preview, the print dialog 113 may provide the print preview generated by the cloud print service 102 within the print dialog 113A, thereby replacing the pseudo print preview. Further, the user may decide to change printing options 113B such as changing the orientation from the portrait view to the landscape view. When the user makes such a change, the print preview 113C may switch back to the pseudo print preview while the print preview having the adjusted printing option is generated at the cloud print service 102.

Also, instead of arranging the printer options 113B to be adjacent to the print preview 113C, one or more printing options may be selected via the print preview 113C as shown by the dashed rectangle within the print preview 113C. For example, the application 112 may provide a user interface controller 111 that is configured to receive a selection of one or more of the printing options 113B via the display contents of the print preview 113C. Instead of providing the conventional radio buttons associated with the selection of printing options, the user interface controller 111 may be configured to provide user controls for the selection of the printing options 113B via the print preview 113C. In other words, the selection of the printing options 113B may occur directly through the displayed contents of the print preview (either the pseudo print preview or the cloud-generated print preview). The user interface controller 111 may receive information indicating a graphical manipulation of the displayed contents of the print preview 113C or a portion thereof. In one example, the user may rotate the print preview 113C in order to change the printing option of landscape to portrait, or vice versa. The act of rotating may be performed by the user himself/herself in the case that the device 108 includes a touchscreen display. Also, the act of rotating may be performed by a pointing device or touchpad in the case of a personal computer or laptop computer, for example. In another example, the user may select a type of paper size by dragging the top or bottom of the print preview 113C, thereby increasing or decreasing the size of the print preview 113C. The above two examples are for explanatory purposes only, where the embodiments encompass any type of action by the user (indirectly or directly) that manipulates the displayed contents of the print preview 113C. Additional examples are illustrated with reference to FIGS. 4B-4E. Also, although the above-description relates to the pseudo print preview or the print preview provided by the cloud print service 102, the concept and features relating the interactive user controls provided on the print preview itself may be extended to any conventional print paradigm, which is further explained with reference to FIG. 1B.

The printer list 113A may include the entire list of printers associated with the user account of the user for cloud printing. For example, the entire list of printers includes the cloud-aware printer 118 and/or the legacy printer, as well as other cloud-aware printers 118 and/or legacy printers that are associated with the cloud print service 102. In one example, the entire list of printers include the printers that are registered with the cloud print service 102 for a particular user as well as publically-available printers that have registered with the cloud print service 102. The publically available printers may include printers that located at a business (e.g., coffee shops, printing centers, etc.) that may charge a fee for printing.

Referring to FIG. 1, the cloud print server 102 may include a number of example components or modules which may be utilized to implement functionalities of the cloud print service 102, and, in particular, may be utilized to implement the various print preview/pseudo print preview aspects described herein. For example, the cloud print service 102 may include a registration manager 126, which may be configured to register printers and users. The registration manager 126 may be configured to receive a registration of the cloud-aware printer 118 and/or the legacy printer, including storing identification information therefore within a data store 127a of registered printers. Similarly, the registration manager 126 may be configured to register a user(s) who may currently or potentially wish to execute print jobs using the cloud print service 102, and to store identification information for such users within a data store 127b of registered users.

There are many examples scenarios and techniques by which users and/or printers may come to be registered with the cloud print server 102 though the registration manager 126. In general, for example, a user of the device 108 may use a browser to visit a website associated with the cloud print service 102, and may enter a username/password combination to establish a user account with the cloud print service 102. In some examples, users already may have a user account with a separate and possibly related service or service provider. For example, various online services (e.g., other cloud-based computing resources) may provide functionalities such as email, data storage, and document processing, and, in such cases, the user may already have a secure user account established in connection therewith. In such cases, the cloud print service 102 may leverage or access such existing user accounts, e.g., to avoid a need to create a new user account, and to facilitate access of existing users of other services with the cloud print service 102, such as, e.g., for implementation of the printer-sharing techniques just described.

Thus, it may be appreciated that although the registration manager 126 is illustrated as being included within the cloud print service 102, it also may occur that some or all functionality related to the registration manager 126 may exist externally to the cloud print service 102. For example, the application server 114 may provide an email application as the application 116, and a user of the device 108 may be registered with this email application (service). In such a case, the application server 114 may have the responsibility of maintaining the user's account, and the cloud print service 102 may simply interface with the application server 114 and provide access to the user once the user is logged on into the application 116.

Further in FIG. 1, an application manager 128 may be configured to communicate with any application which may be desired to be used for printing within the system of FIG. 1, including, e.g., the application 112, and the application 116. Thus, for example, the application manager 128 may implement various application programming interfaces (APIs) which enable such communication with external applications. For example, the application manager 128 may include a print dialog API 130, which may be configured to render the print dialog 113 including the printer list 113A, the printing options 113B, and the print preview/pseudo print preview 113C, as well as any other print dialog component relevant to the cloud print service 102. A job submit API 132 may be utilized to receive the identification of application content submitted by the user by way of the print dialog 113. The job submit API 132 may be configured to submit a corresponding print job, including application content to be printed and associated selected printing options, to a format converter 136, which may be configured to execute a conversion of the print job into a format which is consistent and compatible with the cloud-aware printer 118. The application manager 128 may communicate with the application 112, 116 (or other application) in a format that is independent of a specific printer, e.g., that is generic with respect to all available or relevant printers within the system.

As indicated above, the application manager 128 may receive a print request over the network 106 from a user of the application 112, 114, and provide the print dialog 113, over the network 106, to the user. Also, a print preview that is generated at the cloud print service 102 may be provided in the print dialog 113. For example, a print preview generator 129 may access the content to be printed and generate a print preview providing at least a portion of the content display in accordance with one or more printing options. In particular, in response to the print request, the content may be uploaded from the application 112, 116 to the cloud print service 102 via the network 106. For example, if the content is associated with the user on the application-side, the print preview generator 129 may access the content to be printed by uploading the document from the application 112, 116 to the cloud print service 102 at or around the time of receipt of the print request. Also, the print preview generator 129 may access the content from any other server, database, or network element that stores the document(s) to be printed. For example, the user may have an associated email account that supports document storage, editing and management functionalities. As such, in this case, the print preview generator 129 may access the content of the document from the appropriate server/database/network element that stores such information.

However, according to the embodiments, before the print preview is received at the application 112, 116, a pseudo preview generator 131 may generate a pseudo print preview of the content subject to the print request. In other words, the pseudo preview generator 131 may be configured to provide the pseudo print preview for display within the print dialog 113 while the actual print preview is being generated by the print preview generator 129. The pseudo print preview may provide a generic representation of the document or a portion thereof. The generic representation may be a blank page (e.g., white) with indicator information (e.g., a spinner) that indicates that the full print preview is being generated at the cloud print service 102. Examples of the pseudo print preview are further illustrated in FIGS. 3A and 3C. However, the embodiments encompass any type of generic representation that shows a generic layout of the document or a portion thereof to be printed. Further, the pseudo print preview may be arranged according to one or more selected printing options. For example, printing options may be pre-selected by the cloud print service 102 (e.g., default printing options such as portrait orientation), determined based on the user preferences in a user account, and/or selected via the print dialog 113, for example. As such, the pseudo print preview may provide the generic representation displayed in accordance with the one or more selected printing options. In one example, if the selected printing option is the portrait orientation, the pseudo preview generator 131 may generate the pseudo print preview as having the portrait orientation.

Referring to FIG. 1, the pseudo preview generator 131 is illustrated as being associated with the print cloud service 102. In this implementation, the pseudo preview generator 131 may provide the pseudo print preview over the network 106 to the application 112, 114 for display within the print dialog 113. Alternatively, the pseudo preview generator 131 may be associated with the application 112, 114. As such, the logic for the pseudo preview generator 131 may reside on the operating system 110 or the application server 114, and therefore may be automatically configured to provide the pseudo print preview within the print dialog 113 upon receipt of a print request.

In one embodiment, as the print preview generator 129 accesses the document and generates at least a portion of the print preview, the print preview generator 129 may transmit, over the network 106, the portion of the generated printed print preview via the application manager 128 while the print preview for the other portions of the document are being generated. For example, if the print preview generator 129 generates the first page of the document, the print preview generator 129 may transmit the first page of the print preview over the network 106 to be displayed within the print dialog 113 while the subsequent page(s) is/are being accessed. The print preview for the first page of the document may then replace the pseudo print preview in the print dialog 113. Subsequently, as the print preview generator 129 generates the print preview for the other subsequent pages, the print preview generator 129 may transmit the generated print preview for the other pages in a page-by-page manner (or multiple pages at one or more times). In other words, the print preview generator 129 may provide the portions of the print preview within the print dialog 113 as they are being generated so that the user does not have to wait for the entire document to be uploaded. Alternatively, the print preview generator 129 may provide the full print preview at a time when the entire document is uploaded and its print preview is generated.

Similar to the pseudo print preview, the print preview generator 129 may arrange the print preview according to the selected printing options. In one particular example, if the selected printing option includes a landscape orientation, the print preview generator 129 generates the print preview such that the displayed contents of the print preview have the landscape orientation. The print preview generator 129 may store the generated print preview in a content storage 129a. As such, if the user wishes to view the same generated print preview, the print preview generator 129 does not have to re-generate the print preview. Rather, the print preview generator 129 may access the stored print preview from the content storage 129a, and provide the already-generated print preview in the print dialog 113.

Thereafter, the user may decide to change or adjust the printing options. As such, the print preview generator 129 may receive option adjustment information, over the network 106, from the application 112, 114. The option adjustment information may indicate an adjustment to one or more of the printing options provided in the print dialog 113. Then, the print preview generator 129 may generate the print preview including providing the content or a portion thereof displayed in accordance with the adjusted one or more printing options, and provide the adjusted print preview in the print dialog 113.

In one embodiment, when the print preview generator 129 receives the option adjustment information, the print preview generator 129 may determine whether or not the print preview according to the adjusted one or more printing options is stored in the content storage 129a. If the print preview having the adjusted one or more printing options is located in the content storage 129a (e.g., it was previously generated), the print preview generator 129 may select the stored print preview and provide the stored print preview for display in the print dialog 113. However, if the print preview having the adjusted one or more printing options is not located in the content storage 129a (e.g., it was not previously generated), the print preview generator 129 may generate the print preview based on the content to be printed and the adjusted one or more printing options. In addition, in response to receipt of the adjustment to one or more printing options, the pseudo preview generator 131 is configured to provide the pseudo print preview, thereby replacing the print preview, until the print preview having the adjusted one or more printing options is available. These and other features relating to the print preview and the pseudo print preview are further explained later in the disclosure.

As mentioned above, according to the embodiments, the user interface controller 111 may be configured to receive the selection of one or more printing options through the displayed content of the print preview. Alternatively, the user interface controller 111 may be configured to receive the selection of the one or more printing options through the displayed content of the pseudo print preview. In other words, the selection of the printing options may occur directly through the displayed contents of the print preview (either the pseudo print preview or the full print preview). The user interface controller 111 may receive information indicating a graphical manipulation of the displayed contents of the print preview 113 or a portion thereof. In one example, the user may rotate the print preview 113C in order to change the printing option of landscape to portrait, or vice versa. The act of rotating may be performed by the user himself/herself in the case that the device 108 includes a touchscreen display. Also, the act of rotating may be performed by a pointing device or touchpad in the case of a personal computer or laptop computer, for example. In another example, the user may select a type of paper size by dragging the top or bottom of the print preview 113C, thereby increasing or decreasing the size of the print preview 113C. The user interface controls of the embodiments may be applied in the context of cloud printing or within conventional printing techniques.

Figure 1B:
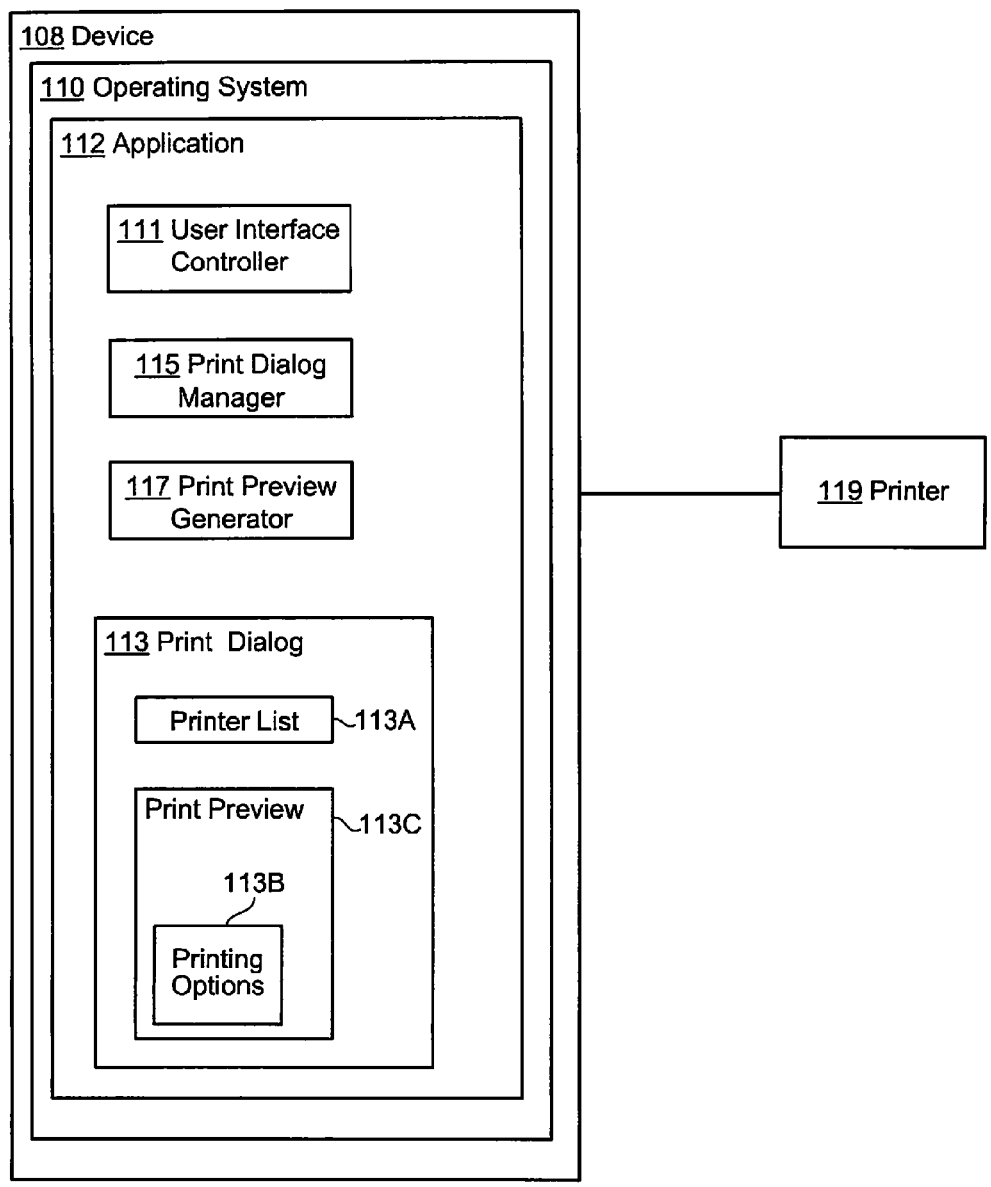
FIG. 1B is a block diagram of a system for controlling a selection of one or more printing options via a user interface according to an embodiment.

FIG. 1B is a block diagram of a system for controlling a selection of one or more printing option via a user interface according to an embodiment. For example, the system of FIG. 1B illustrates the device 108 having the operating system 110 and the application 112, as previously described with respect to FIG. 1. However, the device 108 of FIG. 1B is not connected to the cloud print service 102 and does not involve the cloud-aware printer 118. Rather, the device 108 is connected to a conventional printer 119 having conventional functionality. The device 108 may be connected to the conventional printer 119 via any type of wired/wireless connection. Further, the device 108 may be connected to the conventional printer 119 via any type of network connection involving the public Internet or other wide area public or private network, as well as smaller-scale networks such as a corporate intranet, and/or local or personal network, any of which may be implemented using standard network technology. Although not explicitly shown in FIG. 1B, the operating system 110 may include the printer driver associated with the conventional printer 119 in the context that the conventional printer is locally connected to the device 108. However, the printer driver associated with the conventional printer 119 may be located on a server or other network component apart from the device 108.

As shown in FIG. 1B, the application 112 includes the user interface controller 111, as previously described with reference to FIG. 1A, that is configured to receive a selection of the one or more printing options through the displayed content of the print preview 113C. For example, in response to a print request, a print dialog manager 115 may provide the print dialog 113, which includes the printer list 113A and the print preview 113C. The printer list 113A may include the printer 119 as well as any other printer available to the device 108 for printing. Further, a print preview generator 117 may provide a print preview of the content to be printed within the print dialog 113. According to the embodiments, the selection of one or more printing options 113B is received through the print preview 113. Then, the print preview generator 117 is configured to change the displayed content of the print preview 113C according to the selection of the one or more printing options received through the displayed content of the print preview 113C.

In one embodiment, the user interface controller 111 may receive information indicating a graphical manipulation of the displayed content of the print preview 113C or a portion thereof by the user. For example, in the case that the device 108 includes a touch screen display, the user may manipulate the displayed content of the print preview 113C on the touch screen display in order to change the type of printing option. In the case that the device 108 is a personal computer or laptop computer, the user may manipulate the displayed content of the print preview 113C using a pointing device or touch pad. The manipulation may include moving the displayed content of the print preview 113C or a portion thereof such as rotating the displayed content of the print preview 113C or the portion thereof.

The print preview 113C may be a representation of a document according to a printing option such as the portrait orientation. However, the user may wish to preview the document in a landscape orientation. As such, according to the embodiments, the user may rotate the displayed content of the print preview 113C, which causes the user interface controller 111 to receive the user's selection. In response, the print preview generator 117 is configured to change the displayed content of the print preview 113C to the landscape orientation according to the landscape selection received through the displayed content of the print preview 113C. Example embodiments of the user controls for controlling printing options through the displayed content of the print preview are further illustrated in FIGS. 4B-4E.

Referring back to FIG. 1, because various types of printers have a wide variety of printing options, which may describe the same printing options in a number of different formats, the cloud print service 102 may also include an options translator 133 in order to provide the display of the printing options in a uniform manner. For example, the options translator 133 is configured to determine one or more printing options associated with the available cloud aware printers 118, and translate a native printer display format of the printing options in a common protocol display format associated with the cloud print service 102. The native printer display format for a particular printing option may be the display format provided by the individual vendor of the printer. However, multiple display formats may exist for the same printing option. As such, the cloud print server 104 may translate the native printer display format of the printing options into the common protocol display format. The common protocol display format may be a display format that is uniform across all cloud-aware printers. Also, the common protocol display format permits the cloud print service 102 to provide a uniform and user-friendly print preview of the document subject to the print request.

The printing options that are understood by the cloud print service 102 and translated into the common protocol display format may be considered semantically supported and may be referred to as semantic printing options. The cloud print service 102 may semantically support any number and type of printing options such as page resolution, duplex printing (e.g., long-side, short-side), page range, page orientation, size, type of paper, options for color rendering, staples or no staples, split sheet capability, option for bypass tray to put cards, cover inserter, color brightness, page order being forward or reverse, lines per inch in the document being a range from 300 to 1800 and more specifically 300, 600, 1200 and 1800 lines per inch, job fonts, glossy adjust and gradation smoothing for quality of printing, ink separation, screening parameters for quality of printing, color matching, folding, binding, collating, booklet making, slip sheet, drilling, and trimming for job finishing. These options constitute broad capabilities for printing such as job layout, job definition, job quality, job content, job description, job color, job imposition and job finishing.

In one example, the options translator 133 may determine the printing options from capability files that may be stored in a printer characteristics database 134. The printer characteristics database 134 may store any type of characteristic associated with the registered cloud-aware prints such as capabilities (e.g., in a form of a capability file), features, and any other type of attribute associated with the printer. The capability files may include information created by vendors to describe the entire set of features and capabilities available for a particular printer. Based on the capability files in the printer characteristic database 134, the options translator 133 may determine a set of printing options for the available cloud-aware printers 118 in response to receipt of the print request, and may translate the native printer display format of the printing options associated with the available cloud aware printers 118 into the common protocol display format associated with the cloud print service 102. For example, the options translator 133 may disregard the native print display format of the printing options provided in the capability files, and select the common protocol display format associated with the cloud print service from a translation database 135.

The translation database 135 may store the common protocol display format associated with each capability. For example, for each capability, the translation database 135 may store a corresponding common protocol display format, which may be a common description for a particular printing option. In other words, for a particular printing option (e.g., page resolution), the common protocol display format may be a display format for the printing option that is the same for each printer having the page resolution printing option. Therefore, regardless of the vendor-specific language description, the printing options may be provided to the user in a uniform manner. In addition, the translation database 135 may provide a translation of the common protocol display format in a number of different languages.

Instead of using the native display format of the printing options, the options translator 133 may search the translation database 135 for the capabilities provided by the printer characteristics database 134, and locate the corresponding common protocol display format for the appropriate printing options. In addition, the options translator 133 may determine the language associated with the user, locate the capability names corresponding to the printing options in the translation database 135, and provide the common protocol display format for the printing options in the determined language. For example, the options translator 133 may determine the language of the user based on the user's account from the database 127b of registered users. Also, the options translator 133 may determine the language based on the internet protocol (IP) address associated with the print request. Further, it is noted that the embodiments encompass any known mechanism that may identify a location of the user.

After the user selects the desired printing options, the print job may be generated and forwarded to the cloud print service 102 via the application manager 128. The print jobs received at the application manager 128 may be passed to the format converter 136, which may be configured to receive the print job and facilitate or execute conversion of the print job into a format associated with the designated (type of) printer for the print job in question. Such conversion may thus generally include, as needed, conversion of the print data itself, as well as conversion of the print characteristics specified in conjunction with the given print job.

In more detail, as is known, printers generally require low-level, device or type-specific instructions which provide a base by which printers actually apply ink to paper to achieve a desired appearance. Such instructions may therefore include very specific portrayals of the desired print outcome using, e.g., a page description language (PDL). For example, the language postscript may be used to describe a desired print outcome, which may then be rendered (e.g., or rasterized) by a specific printer using a print text or images. Additionally, fixed-layout document formats exist which are designed to facilitate device-independent printing all maintaining documents available. For example, the portable document format (PDF) is an example of such format, where .PDF documents may be generated using postscript. Somewhat similarly, the XPS format provides such a fixed layout document, which is based on the eXtensible markup language (XML).

Thus, application content or other print data may be received from the application 112 in virtually any format, including, e.g., hypertext markup language (HTML), or in the format associated with document processing applications and/or images, or any of the formats referenced above. The format converter 136 may thus be configured to receive print data in these and any other various formats, and to convert the print data into a format that is recognizable by a designated printer.

Similarly, as referenced above, the format converter 136 may be configured to convert the print characteristics associated with the print job into a format that is recognizable by the designated printer 118. That is, as referenced above, the print characteristics may include aspects of how the print data should or can be printed; i.e., based on preferences of the user and/or (capabilities, or lack thereof) of the designated printer. The format converter 136 may thus provide appropriate conversion, depending on a selected printer and/or on preferences of the user. The format converter 136 may then provide and execute a resulting, converted print job using, e.g., a protocol referred to herein as the cloud print protocol (CPP). Thus, the cloud print protocol allows the cloud print service 102 to communicate with the cloud-aware printer 118 (or with a legacy printer enabled to communicate with the cloud print service 102).

The cloud print service 102 may include job storage 140 which may provide one or more types of data storage related to operations of the cloud print service 102. For example, the job storage 140 may store print jobs and related information, where such print jobs/information may be stored prior to and/or after the format conversions provided by the format converter 136. For example, a print job may be stored in a printer-independent format in which the print job may have been received by the job submit API 132.

Further in the example of the cloud print service 102 of FIG. 1, a print job router 138 may be configured to route the converted print job from the format converter 136 and/or the job storage 140 to a designated printer, e.g., the cloud-aware printer 118. The print job router 138 may further be configured to monitor and mediate execution and success/failure of a given print job. The print job router 138 may thus be responsible for managing and monitoring ongoing print jobs from a plurality of users, which may be designated for a corresponding plurality of printers, including the cloud-aware printer 118.

As shown, the print job router 138 may include or otherwise be associated with a job fetch API 142 and/or a job control API 143. For example, the job fetch API 142 may be configured to provide the print job to the cloud-aware printer 118, e.g., may be used by the cloud-aware printer 118 to fetch a desired print job. The job control API 143 may be responsible for authorizing the cloud-aware printer 118 as needed, and for receiving updated status information from the cloud-aware printer 118, e.g., whether the print job has completed or failed. Such status information also may be stored using the job storage 140, in association with the corresponding print job in question. The job control API 143 also may include status information including, e.g., whether a print job is currently queued by not yet downloaded to a corresponding printer, or spooled/downloaded and added to a native printer queue of the cloud-aware printer 118 (if applicable).

Furthermore, the print job router 138 may be configured to periodically check a status of a printer(s), using a corresponding print client such as print client 146. For example, the print job router 138 may be aware that the cloud-aware printer 118 is available, as long as the cloud-aware printer 118 is powered on at a given time.

As just referenced, the cloud-aware printer 118 may utilize various hardware/software components during normal printing operations. For example, during execution, the print job router 138 may be configured to communicate with, e.g., a print client 146 executing on firmware 144 of the cloud-aware printer 118. The print client 146 may communicate with the cloud print service 102, e.g., with the print job router 138, using the cloud print protocol referenced herein.

More specifically, the print client 146 may be configured to register the cloud-aware printer 118 with the cloud print service 102, and to thereby associate the thus-registered printer 118 with a user of the device 108. Moreover, the print client 146 may be configured to actually drive the cloud-aware printer 118 and thereby execute the desired printing.

In the example of FIG. 1, the cloud-aware printer 118 is illustrated as including the print client 146 within the firmware 144. The firmware 144, as would be appreciated by one of skill in the art, may represent factory installed hardware and/or software which provides designated functions without generally requiring or allowing user modification or configuration (e.g., may utilize read-only memory). Thus, the cloud-aware printer 118 may be preconfigured from before time of purchase to communicate and coordinate with the cloud print service 102, to thereby provide a convenient and enjoyable user experience.

For example, the cloud-aware printer 118 may include a network access manager 148, user input 150, and a display (or other user output) 152, which may generally represent otherwise-conventional components that are therefore not described here in detail except as may be needed to assist in understanding example operations of the system. Of course, the cloud-aware printer 118 need not include all of the components 144-152, and/or may include additional or alternative components, which are also not discussed here in detail.

In the example of FIG. 1, the network access manager 148 may represent associated hardware/software which enables a cloud-aware printer 118 to communicate over the network 106 with the cloud print service 102. For example, such communication may be conducted wirelessly if the cloud-aware printer 118 is within range of an appropriate wireless network. In other examples, the network access manager 148 may enable a wired connection of the cloud-aware printer 118 to the network 106, e.g., by way of connection to an appropriate router.

The user input 150 may represent virtually any sort of keypad, stylus, or other input technique for entering data to the cloud-aware printer 118. Similarly, the display 152 may represent virtually any sort of audio and/or video display to output information to the user 125 or other user of the cloud-aware printer 118.

It will be appreciated that many other configurations of the cloud-aware printer 118 or other printers are contemplated for use in conjunction with the system. For example, as referenced above, a legacy printer, not specifically illustrated in the example of FIG. 1, may lack some of the functionality of the cloud-aware printer 118. For example, such a legacy printer may not have the network access manager 148 and/or the firmware 144 which may be utilized to implement the print client 146 and otherwise communicate with the cloud print service 102. In such cases, the print client 146 may be configured to execute on or in conjunction with a computing device which is in communication with the legacy printer, and which has the available resources necessary to implement the functionalities described herein, and which may include an otherwise conventional printer driver communicating with the legacy printer in question. Other variations and implementations of the printer 118 or related printers would be apparent, and are not described here in detail, except as may be necessary or helpful in understanding operations of the roving printer scenarios described herein.

Figure 2A:
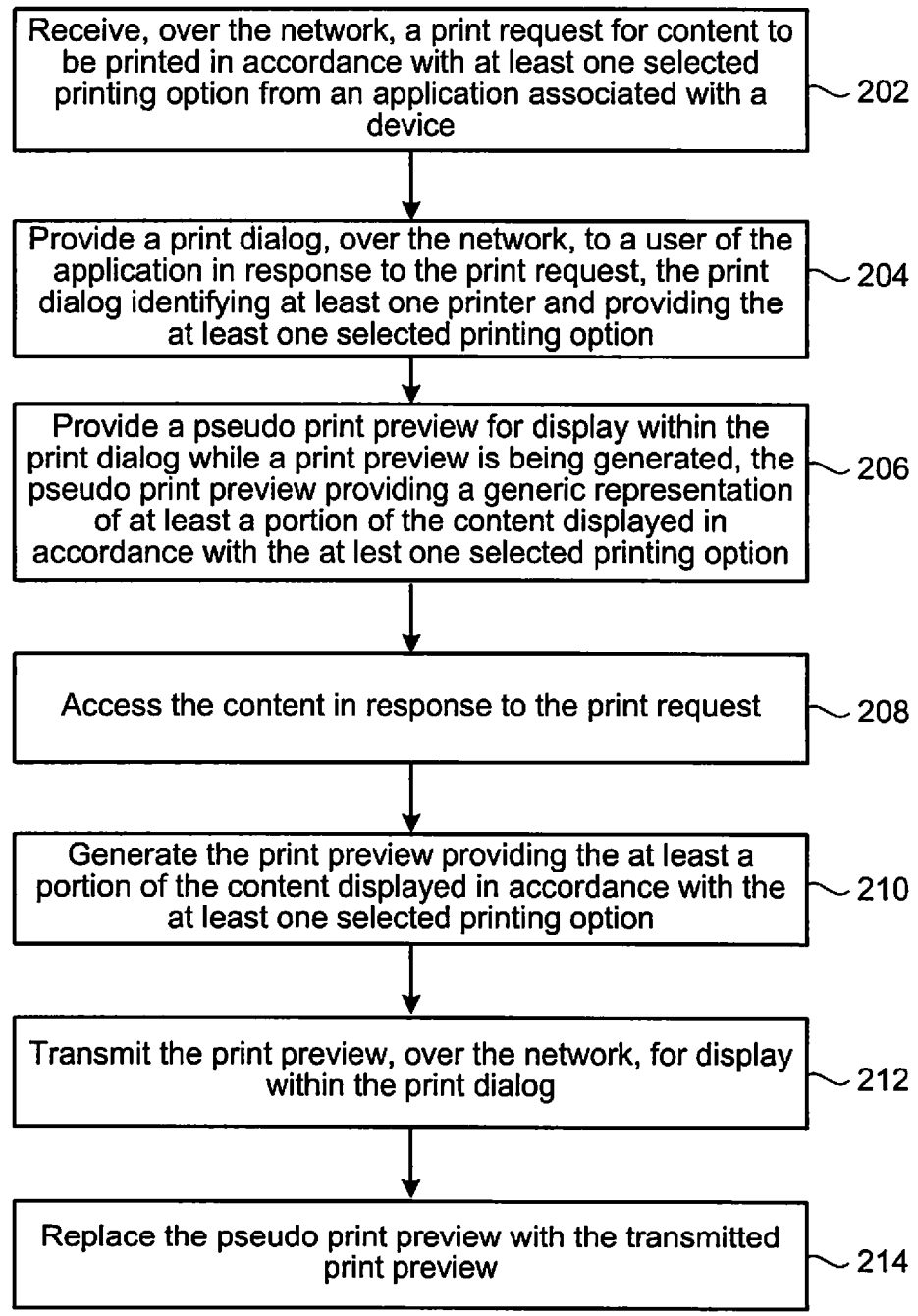
FIG. 2A is a flowchart illustrating example print preview operations of the system of FIG. 1 according to an embodiment.

FIG. 2A is a flowchart illustrating example print preview operations 202-214 of the system of FIG. 1A according to an embodiment. Although the flowchart of FIG. 2A illustrates the operations 202-214 in sequential order, it will be appreciated that this is merely an example, and that additional or alternative operations may be included. Further, operations of FIG. 2A and related operations may be executed in a different order than that shown, or in a parallel or overlapping fashion.

A print request for content to be printed in accordance with at least one selected printing option may be received from an application associated with a device (202). For example, the application manager 128 may receive, via a suitable API such as the print dialog API 130, a print request from the application 112, 116 associated with the device 108. In one example, the user may select print from a menu provided by the application 112, 116, which displays a print dialog specific to the application 112, 116. In other words, the initial print dialog may be in a format developed by the application 112, 116. However, within the printer selection of the initial print dialog, there may be a selection for printing using the cloud print service 102. Upon selecting the option for using the cloud print service 102, the application 112, 116 may transmit a print request over the network 106, which is then received by the application manager 128.

A print dialog may be provided over the network to a user of the application in response to the print request (204). For example, the application manager 128 may provide the print dialog 113 via a suitable API such as the print dialog API 130 over the network 106 to the user of the application 112, 116. In addition, the embodiments encompass the situation where an initial application specific print dialog is not initially provided. Rather, upon selecting print from a menu provided by the application 112, 116, the print request is transmitted to the cloud print service 102, and the application manager 128 provides the cloud-generated print dialog 113 over the network 106 to the user of the application 112, 116. As described above, the print dialog 113 identifies at least one printer such as the cloud aware printer 118, and provides one or more printing options 113B associated with each printer in the print dialog 113.

A pseudo print preview is provided for display within the print dialog while a print preview is being generated (206). For example, before the print preview is received at the application 112, 116, the pseudo preview generator 131 may generate a pseudo print preview of the content subject to the print request. In other words, the pseudo preview generator 131 may be configured to provide the pseudo print preview for display within the print dialog 113 while the full print preview is being generated by the print preview generator 129. The pseudo print preview provides a generic representation of at least a portion of the content displayed in accordance with the at least one selected printing option. The generic representation may be a blank page (e.g., white) with indicator information (e.g., a spinner) that indicates that the full print preview is being generated. Also, as indicated above, the pseudo print preview may provide the generic representation displayed in accordance with the one or more selected printing options. In one example, if the selected printing option is the portrait orientation, the pseudo preview generator 131 may generate the pseudo print preview as having the portrait orientation.

The content may be accessed in response to the print request (208). For example, in response to the print request, the print preview generator 129 may upload the content from the application 112, 116 to the cloud print service 102 via the network 106. If the content is associated with the user on the application-side, the print preview generator 129 may access the content to be printed by uploading the document from the application 112, 116 to the cloud print service 102. Also, the print preview generator 129 may access the content from any other server, database, or network element that stores the document(s) to be printed.

The print preview providing the at least a portion of the content displayed in accordance with the at least one selected printing option may be generated (210). For example, as the print preview generator 129 retrieves the document, the print preview generator 129 generates the print preview according to the selected one or more printing options. In one particular example, if the selected printing option includes a landscape orientation, the print preview generator 129 generates the print preview such that the displayed contents of the print preview have the landscape orientation. The print preview generator 129 may store the generated print preview in the content storage 129a. As such, if the user wishes to view the same generated print preview, the print preview generator 129 does not have to re-generate the print preview. Rather, the print preview generator 129 may access the stored print preview from the content storage 129a, and provide the already-generated print preview in the print dialog 113.

The print preview may be transmitted over the network for display within the print dialog (212), thereby replacing the pseudo print preview with the transmitted print preview (214). For example, as the print preview generator 129 accesses the document and generates at least a portion of the print preview, the print preview generator 129 may transmit, over the network 106, the portion of the generated printed print preview via the application manager 128. In one example, if the print preview generator 129 generates the first page of the document, the print preview generator 129 may transmit the print preview corresponding to the first page over the network 106 to be displayed within the print dialog 113 while the subsequent page is being accessed. The print preview corresponding to the first page may then replace the pseudo print preview in the print dialog 113. Subsequently, as the print preview generator 129 generates the print preview for the other subsequent pages, the print preview generator 129 may transmit the generated print preview for the other pages. In other words, the print preview generator 129 may provide the portions of the print preview within the print dialog 113 as they are being generated so that the user does not have to wait for the entire document to be uploaded. Alternatively, the print preview generator 129 may provide the full print preview at a time when the entire document is uploaded and its print preview is generated.

Figure 2B:
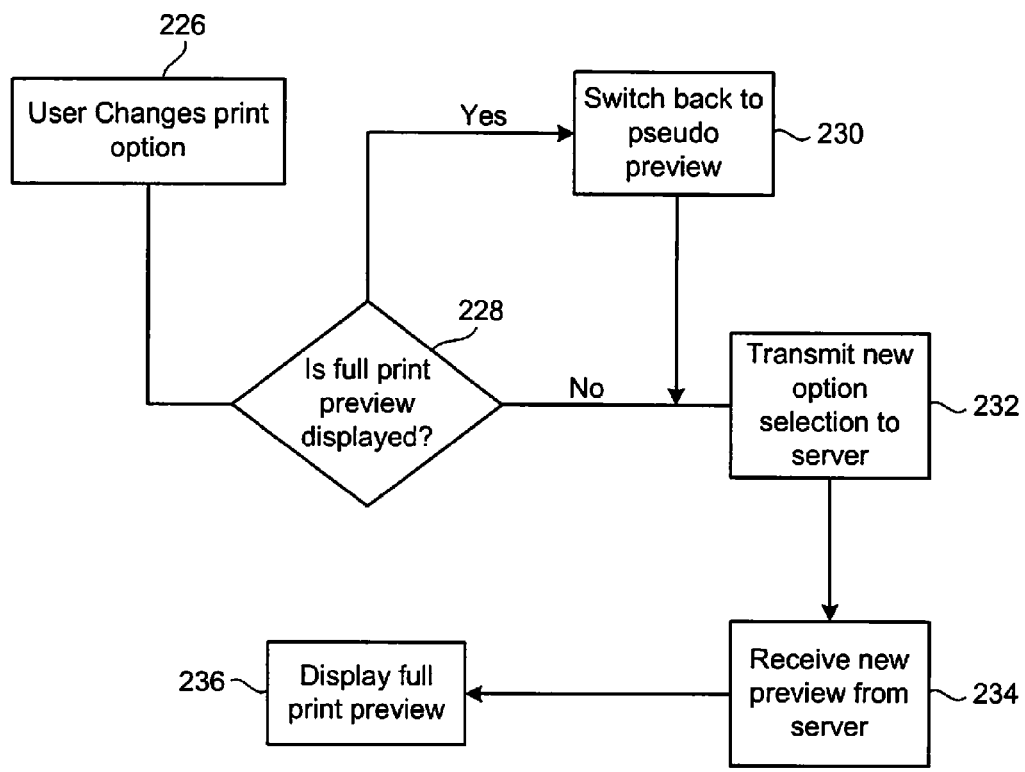
FIG. 2B is a flowchart illustrating example print preview operations of the system of FIG. 1 according to another embodiment.

FIG. 2B is a flowchart illustrating example print preview operations of the system of FIG. 1 according to another embodiment. Although the flowchart of FIG. 2B illustrates the example operations in sequential order, it will be appreciated that this is merely an example, and that additional or alternative operations may be included. Further, operations of FIG. 2B and related operations may be executed in a different order than that shown, or in a parallel or overlapping fashion. The flowchart of FIG. 2B describes the operations of providing the pseudo print preview and the print preview with respect to the user-side.

Print options may be changed by the user (226). For example, within the print dialog 113, the user may change one or more of the printing options via any conventional printing option mechanisms, or adjust the printing options through the displayed content of the print preview in accordance with the embodiments as provided above and further explained with reference to FIGS. 4A-4E.

It is determined whether or not the print preview is displayed (228). For example, in response to the adjustment to the one or more printing options, the application 112, 116 may determine whether the print preview is displayed or the pseudo print preview is still displayed. If the print preview is displayed, the pseudo preview generator 131 provides the pseudo preview, which replaces the print preview (230). However, if it is determined that the pseudo print preview is still being displayed, the application 112, 116 may transmit the option adjustment information to the cloud print service 102 so that the print preview can be adjusted (232). Similarly, after the preview is switched back to the pseudo preview (230), the application 112, 116 may transmit the option adjustment information to the cloud print service 102 so that the print preview can be adjusted (232).

A new print preview is received from a server (234). For example, the application 112, 116 may receive the new print preview that has been generated by the print cloud service 102 over the network 106. The new print preview is arranged according to the adjusted one or more options. After the application 112, 116 receives the new print preview, the print dialog 113 displays the new print preview (236).

Figure 2C:
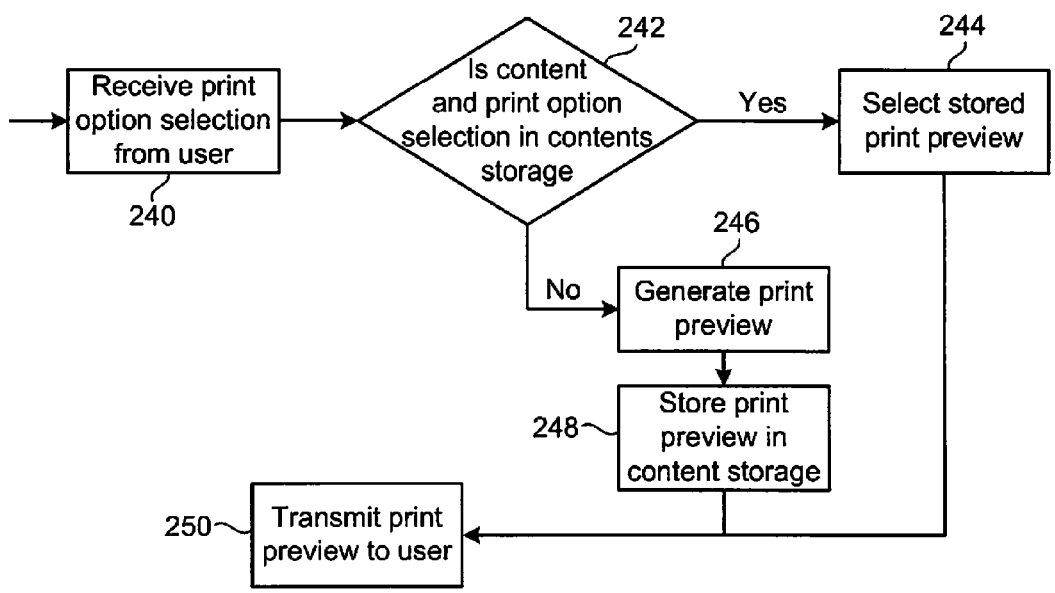
FIG. 2C is a flowchart illustrating example print preview operations of the system of FIG. 1 according to another embodiment.

FIG. 2C is a flowchart illustrating example print preview operations of the system of FIG. 1 according to another embodiment. Although the flowchart of FIG. 2C illustrates the operations in sequential order, it will be appreciated that this is merely an example, and that additional or alternative operations may be included. Further, operations of FIG. 2C and related operations may be executed in a different order than that shown, or in a parallel or overlapping fashion. The flowchart of FIG. 3C describes the operations of providing the pseudo print preview and the print preview with respect to the cloud print service 102.

As indicated above, in response to the print request, the print preview generator 129 is configured to access the content to be printed. The print preview generator 129 may be configured generate the print preview based on the accessed content according to one or more printing options, and provide the generated print preview for display in the print dialog 113. Further, as explained above, the user may change one or more printing options. As such, a print option selection may be received from the user (240). For example, the print preview generator 129 may receive option adjustment information indicating that the user has changed one or more of the printing options provided in the print dialog 113.

It is determine whether or not the content to be printed arranged according to the adjusted one or more printing options is stored in the contents storage (242). For example, the print preview generator 129 determines if a previous print preview having the adjusted printing options has been created and stored in the contents storage 129*a*. If the print preview having the adjusted one or more printing options is stored in the content storage 129*a*, the print preview generator 129 may selected the stored print preview (244), and transmit the stored print preview to the user (250). However, if the print preview having the adjusted one or more printing options is not stored in the content storage 129*a*, the print preview generator may generate a new print preview (246), store the new print preview in the content storage 129*a* (248), and transmit the new print preview to the user (250).

Figure 3A:
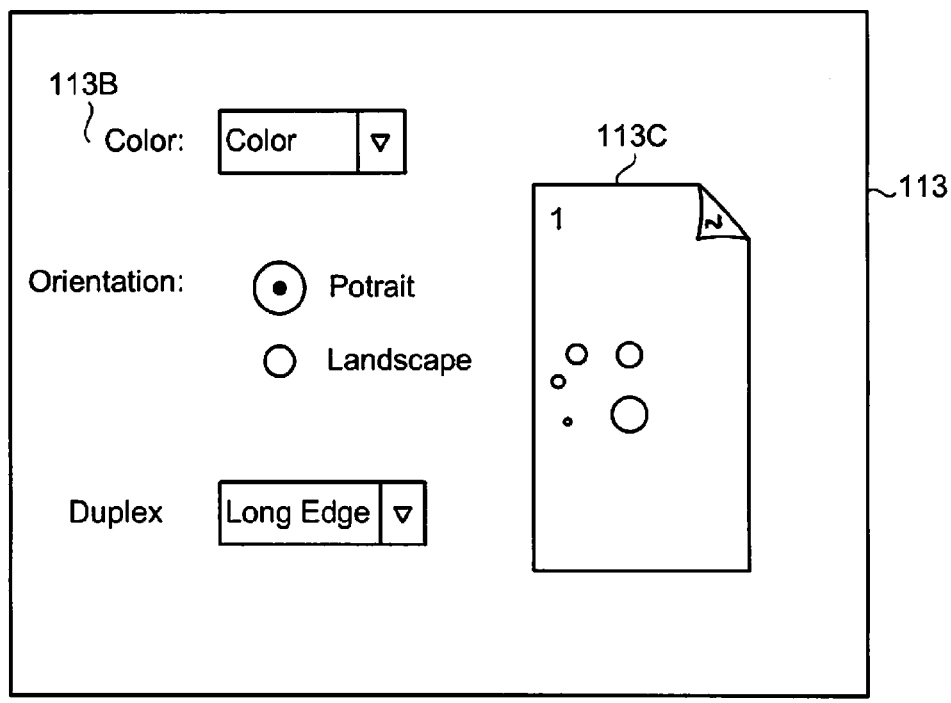
FIG. 3A illustrates an example print dialog including a pseudo print preview according to an embodiment.

FIG. 3A illustrates an example print dialog 113 according to an embodiment. As indicated above, in response to the print request, the application manager 128 provides the print dialog 113 such as the one illustrated in FIG. 3A. In the meantime, the print preview generator 129 may access the document(s) subject to the print request such as uploading the document from the application 112, 116. While the print preview is being generated at the cloud print service 102, the pseudo preview generator 129 may provide the pseudo print preview 113C according to the selected printing options 113B. Generally, the pseudo print preview illustrates how the document will be printed without the actual contents of the document. For example, as shown in the print dialog 113, the printing options 113B include a coloring printing option, an orientation printing option, and a duplex printing option. According to this example, the portrait orientation and the long-edge printing option have been selected. As such, the pseudo print preview 113C displays the generic representation of the content to be printed in the portrait orientation and in a manner that intuitively illustrates that the long-edge duplex option has been selected (e.g., the top right corner being folded towards the center with the number 2 provided in the triangle and the top left corner having the number 1). Also, the pseudo print preview 113C may include information indicating that the print preview is being generated such as the spinner illustrated in FIG. 3A.

Figure 3B:
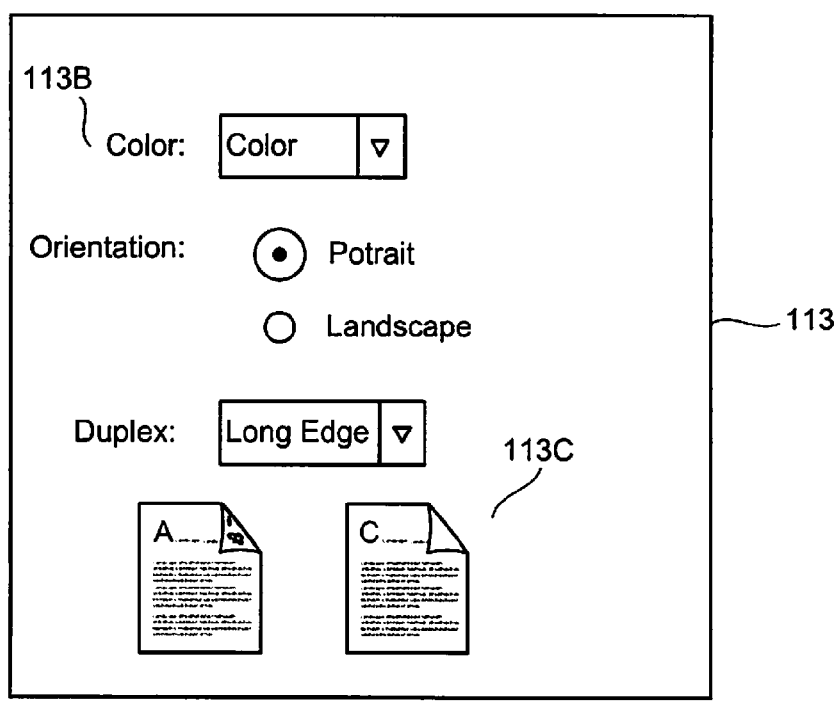
FIG. 3B illustrates an example print dialog including a print preview according to an embodiment.

FIG. 3B illustrates the print dialog 113 having the print preview 113C according to an embodiment. When the full print preview is generated by the print preview generator 129 and transmitted to the application 112, 116, the print preview 113C is provided in the print dialog 113, thereby replacing the pseudo print preview such as the pseudo print preview in FIG. 3A. The print preview is arranged according to the selected printing options such as the portrait landscape and the long-edge printing option. In this particular example, the number of pages to be printed is three when printed in portrait on standard sized paper. According to one embodiment, the print preview 113C may be arranged below the printing options 113, which is different than conventional print previews since conventional print previews are arranged adjacent to the printing options 113B. None-the-less, the embodiments encompass placing the print preview (and pseudo print preview) in any type of location within the print dialog 113 in relation to the printing options 113B.

Figure 3C:
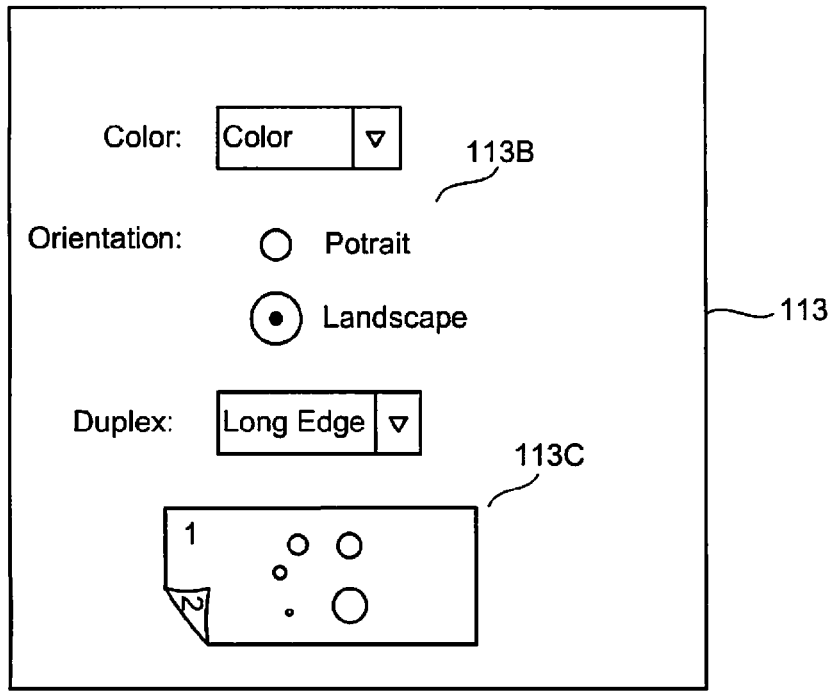
FIG. 3C illustrates an example print dialog including a pseudo print preview according to another embodiment.

FIG. 3C illustrate the print dialog 113 having the pseudo print preview 113C according to another embodiment. Referring to FIG. 3C and continuing with the example of FIGS. 3A and 3B, when the user changes a particular print option 113B (e.g., switching from the portrait orientation to the landscape orientation), the print preview disappears, and the pseudo preview generator 131 provides the pseudo print preview 113C with a loading spinner to indicate that the new print preview is being generated by the cloud print server 102.

Figure 3D:
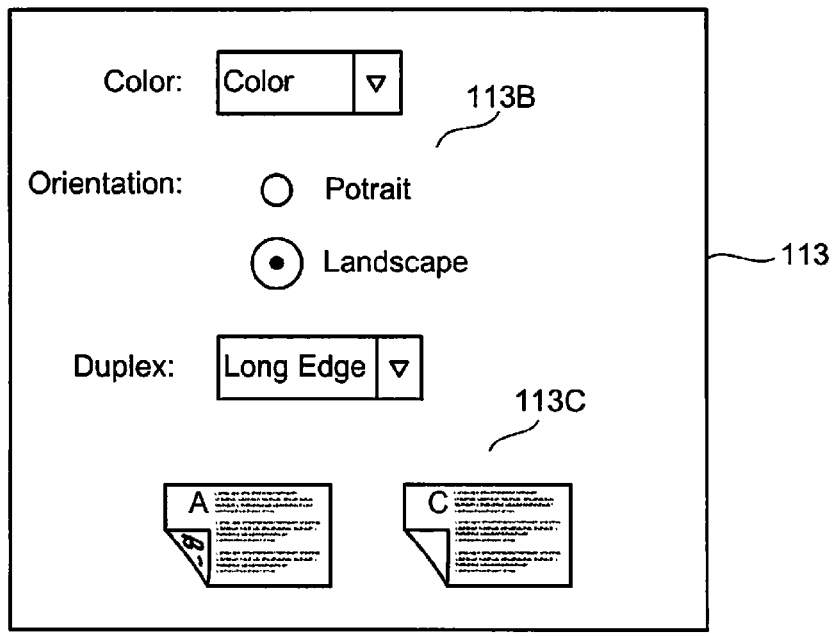
FIG. 3D illustrates an example print dialog including a print preview according to another embodiment.

FIG. 3D illustrates the print dialog 113 having the print preview 113C according to another embodiment. Again, once the new full print preview has been generated by the print preview generator 129 according to the adjusted printing options and transmitted back to the application 112, 116, the print preview 113C replaces the pseudo print preview such as the pseudo print preview shown in FIG. 3C. In the example of FIG. 3D, the document is still 3 pages long even with the change from the portrait to landscape. However, with other printing options, the number of pages may change accordingly.

Figure 3E:
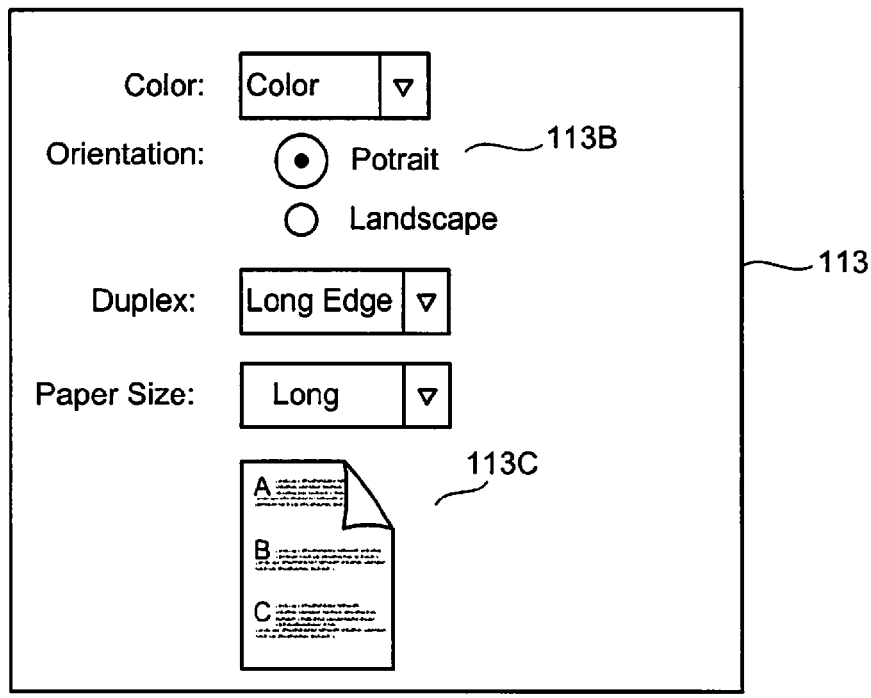
FIG. 3E illustrates an example print dialog including a print preview according to another embodiment.

FIG. 3E illustrates the print dialog 113 having the print preview 113C according to another embodiment. In the example of FIG. 3E, the user has selected a large/long paper size and the print preview has already been generated by the print preview generator 129 and transmitted back to the application 112, 116. According to one embodiment, the selected page size actually causes the entire document to be printed on one page instead of three pages as in the previous examples.

Figure 4A:
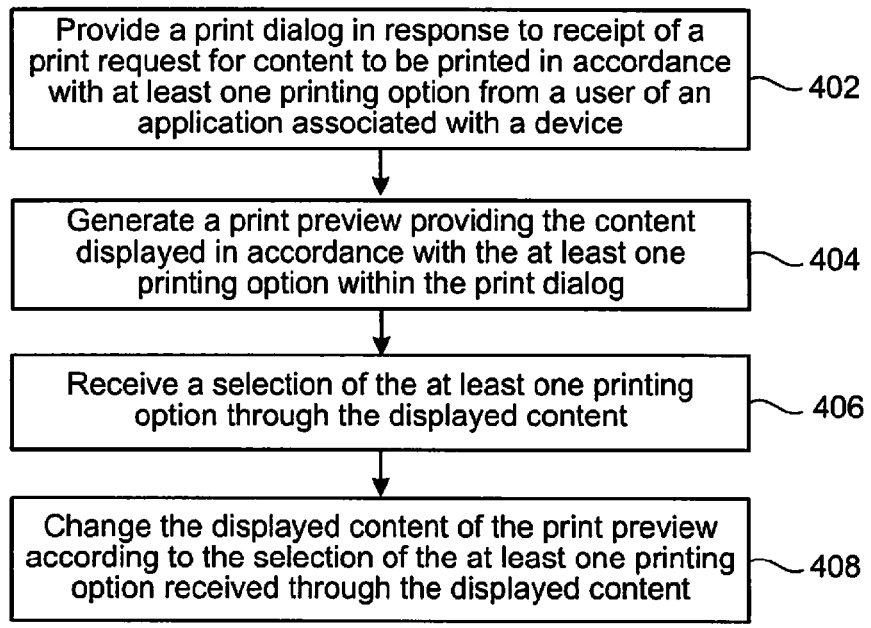
FIG. 4A is a flowchart illustrating example user control operations of the system of FIG. 1 or FIG. 2 according to an embodiment.

FIG. 4A is a flowchart illustrating example user control operations of the system of FIG. 1A or 1B according to an embodiment. Although the flowchart of FIG. 4A illustrates the operations in sequential order, it will be appreciated that this is merely an example, and that additional or alternative operations may be included. Further, operations of FIG. 4A and related operations may be executed in a different order than that shown, or in a parallel or overlapping fashion.

A print dialog may be provided in response to receipt of a print request for content to be printed in accordance with at least one printing option from a user of an application associated with a device (402). In one embodiment, referring to FIG. 1A, the application manager 128 may receive the print request over the network 106 from the application 112, 116 associated with the device 108, and the application manager 128 may provide, over the network 106, the print dialog 113 to the user. In another example, referring to FIG. 1B, the print dialog manager 115 may receive the print request for content to be printed from a user of the application 112 associated with the device 108, and provide the print dialog 113 to the user for display. Further, as discussed above, the print dialog 113 may identify at least one printer in a printer list 113A, and provide printing options 113B associated with each printer. In one embodiment, referring to FIG. 1A, the printer list 113A may include the cloud-aware printer 118 as well as any other printer associated with a user account of the user and/or any publically available cloud-enabled printers that may be used by the user. In another embodiment, referring to FIG. 1B, the printer list 113A may include any printer connected to the device 108 or may be available to the device 108 for printing.

A print preview providing the content displayed in accordance with the at least one printing option may be generated (404). For example, in one embodiment, referring to FIG. 1A, the print preview generator 129 may generate the print preview according to the selected printing options in the manner that was described above, and transmit the print preview 113 over the network 106 to the application 112, 116 to be displayed within the print dialog 113. In other embodiment, referring to FIG. 1B, the print preview generator 117 may generate the print review according to the selected printing options, and provide the generated print preview 113 within the print dialog 113 for display.

A selection of the at least one printing option may be received through the displayed content of the print preview (406). For example, in one embodiment, referring to FIG. 1A, the user interface controller 111 may receive the selection of the at least one printing option through the displayed content of the print preview 113C. In other embodiment, referring to FIG. 1B, the user interface controller 11 may receive the selection of the at least one printing option through the displayed content of the print preview 113C.

In particular, instead of arranging of the printer options 113B to be adjacent to the print preview 113C, one or more printing options 113B may be selected via the print preview 113 C as shown by the dashed rectangle within the print preview 113C in FIG. 1A or the solid rectangle within the print preview 113C of FIG. 1B. In other words, instead of providing the conventional radio buttons associated with the selection of printing options, the user interface controller 111 may be configured to provide user controls for the selection of the printing options via the print preview 113C. The selection of the printing options may occur directly through the displayed contents of the print preview 113C (e.g., in the context of the cloud printing environment, the selection may also be received through the pseudo print preview or the print preview). The user interface controller 111 may receive information indicating a graphical manipulation of the displayed contents of the print preview 113C or a portion thereof, which may include moving the displayed contents or a portion thereof. In one example, the user may rotate the print preview 113C in order to change the printing option of landscape to portrait, or vice versa. The act of rotating may be performed by the user himself/herself in the case that the device 108 includes a touchscreen display. Also, the act of rotating may be performed by a pointing device or touchpad in the case of a personal computer or laptop computer, for example. In another example, the user may select a type of paper size by dragging the top or bottom of the print preview 113C, thereby increasing or decreasing the size of the print preview 113C.

The displayed content of the print preview may be changed according to the selection of the at least one printing option received through the displayed content (408). For example, according to one embodiment, referring to FIG. 1A, the print preview generator 129 may receive option adjustment information indicating the user's adjustment, and may generate the print preview according to the adjusted printing options. In another example, referring to FIG. 1B, the print preview generator 117 may receive the option adjustment information from the user interface controller 111, and generate the print preview according to the adjusted printing options. FIGS. 4B-4E illustrate different variations of the user controls for adjusting the printing options.

Figure 4B:
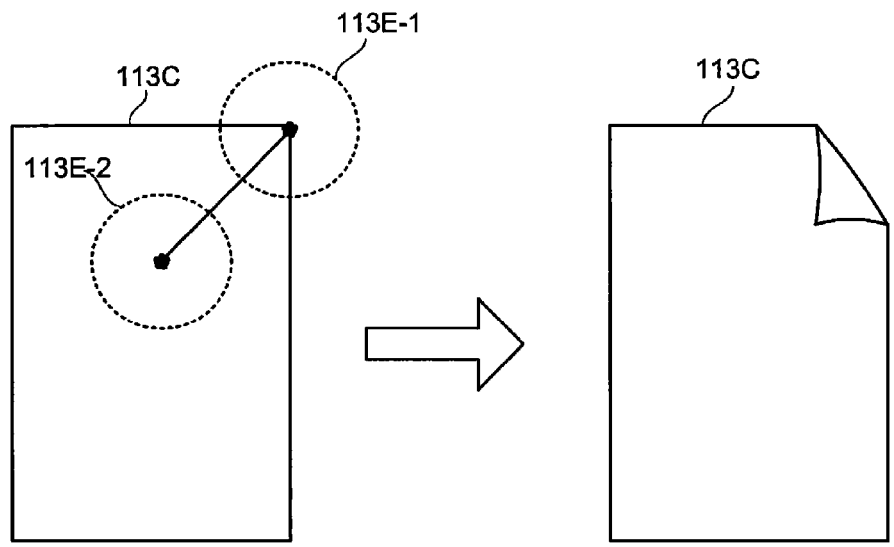
FIG. 4B illustrates a selection for changing the print preview according to an embodiment.

FIG. 4B illustrates a selection for changing the print preview/pseudo print preview according to an embodiment. The left side of FIG. 4B illustrates the print preview 113C before a selection is made. The print preview 113C may be the print preview provided by the print preview generator 129 of FIG. 1A, the pseudo print preview provided by the pseudo preview generator 131 of FIG. 1A, or the print preview provided by the print preview generator 117 of FIG. 1B. Referring to FIG. 4B, the user interface controller 111 of FIG. 1A or 1B may provide user controls on the print preview/pseudo print preview itself such as the controls 113E (e.g., 113E-1 and 113E-2) shown in the figure. The controls 113E of FIG. 4B relate to the selection of the duplex printing option—e.g., long edge option selection. In this particular example, the user may graphically manipulate the print preview/pseudo print preview 113C by moving an outer portion (e.g., top right portion) of the displayed content towards the middle of the print preview/pseudo print preview 113C. In one example, in the case that the device 108 has a touch screen display, the user may drag his/her finger starting within the circle 113E-1 towards the circle 113E-2. Alternatively, in the case of a pointing device, the user may control the pointing device by clicking within the area encompassing the circle 113E-1 and dragging the portion of the displayed content towards the area encompassing the circle 113E-2. In either case, the user interface controller 111 may receive information indicating a movement of an outer portion of the displayed content in order to change the printing option to the long edge option selection. Then, the print preview generator 129 of FIG. 1A, the pseudo preview generator 131 of FIG. 1A, or the print preview generator 117 of FIG. 1B may change the print preview/pseudo print preview including generating the print preview/pseudo print preview having the long edge option selection, which is represented on the right side of FIG. 4B.

Figure 4C:
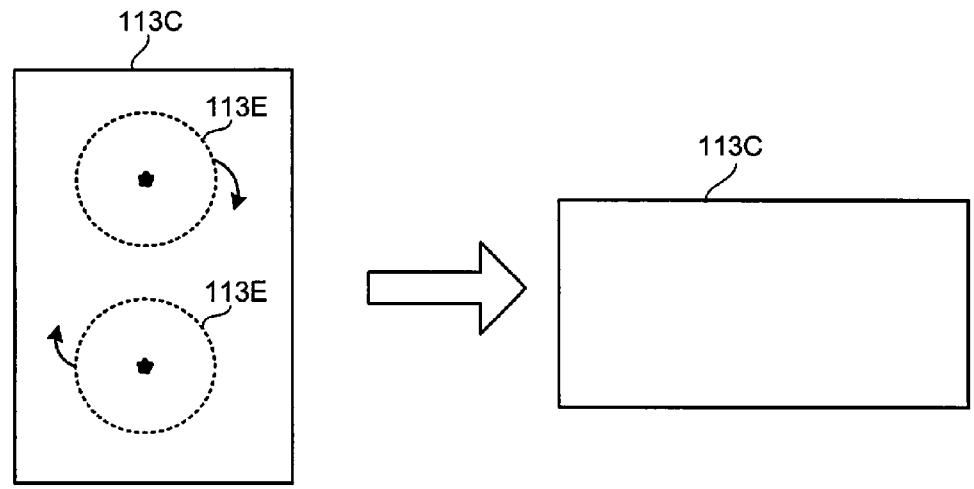
FIG. 4C illustrates a selection for changing the print preview/pseudo print preview according to another embodiment.

FIG. 4C illustrates a selection for changing the print preview/pseudo print preview according to another embodiment. The left side of FIG. 4C illustrates the print preview/pseudo print preview 113C before a selection is made. The print preview 113C of FIG. 4C may be the print preview provided by the print preview generator 129 of FIG. 1A, the pseudo print preview provided by the pseudo preview generator 131 of FIG. 1A, or the print preview provided by the print preview generator 117 of FIG. 1B. Referring to FIG. 4C, the user interface controller 111 of FIG. 1A or 1B may provide user controls on the print preview/pseudo print preview itself such as the controls 113E shown in the figure. The controls 113E of FIG. 4C relate to the selection of the orientation printing option. In this particular example, the user may graphically manipulate the print preview/pseudo print preview 113C by rotating the displayed content of the print preview/pseudo print preview 113C using the controls 113E. In this case, the controls 113C may represent a two-finger rotation gesture, or a circular pointing device motion to cause the print preview 113C to rotate to the desired position such as the landscape orientation. In either case, the user interface controller 111 may receive information indicating a rotation of the displayed content of the print preview/pseudo print preview 113C in order to change the printing orientation. Then, the print preview generator 129 of FIG. 1A, the pseudo preview generator 131 of FIG. 1A, or the print preview generator 117 may change the print review/pseudo print preview including generating the print preview/pseudo print preview 113C having the landscape orientation, which is represented on the right side of FIG. 4C.

Figure 4D:
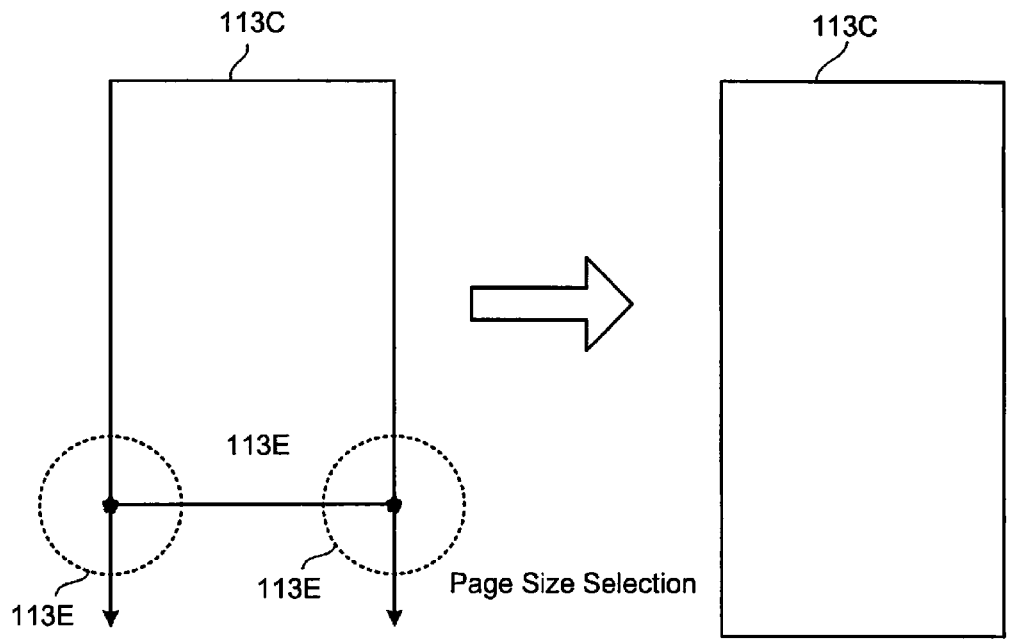
FIG. 4D illustrates a selection for changing the print preview/pseudo print preview according to another embodiment.

FIG. 4D illustrates a selection for changing the print preview/pseudo print preview according to another embodiment. The left side of FIG. 4D illustrates the print preview/pseudo print preview 113C before a selection is made. The print preview 113C of FIG. 4D may be the print preview provided by the print preview generator 129 of FIG. 1A, the pseudo print preview provided by the pseudo preview generator 131 of FIG. 1A, or the print preview provided by the print preview generator 117 of FIG. 1B. Referring to FIG. 4D, the user interface controller 111 of FIG. 1A or 1B may provide user controls on the print preview/pseudo print preview itself such as the controls 113E shown in the figure. The controls 113E of FIG. 4D relate to the page size selection printing option. To choose a different paper size, the user may draft one or both of the corners of the displayed content of the print preview/pseudo print preview 11C to the desired height/width. The controls 113E may lock the height/width at discrete positions depending on the printer's capabilities. Generally, the user interface controller 111 may receive information indicating a movement of an outer portion (e.g., bottom of the displayed content) to a desired page size. Then, the print preview generator 129 of FIG. 1A, the pseudo preview generator 131 of FIG. 1A, or the print preview generator 117 may change the print preview/pseudo print preview including generating the print preview/pseudo print preview 113C having the desired size, which is represented on the right side of FIG. 4D.

Figure 4E:
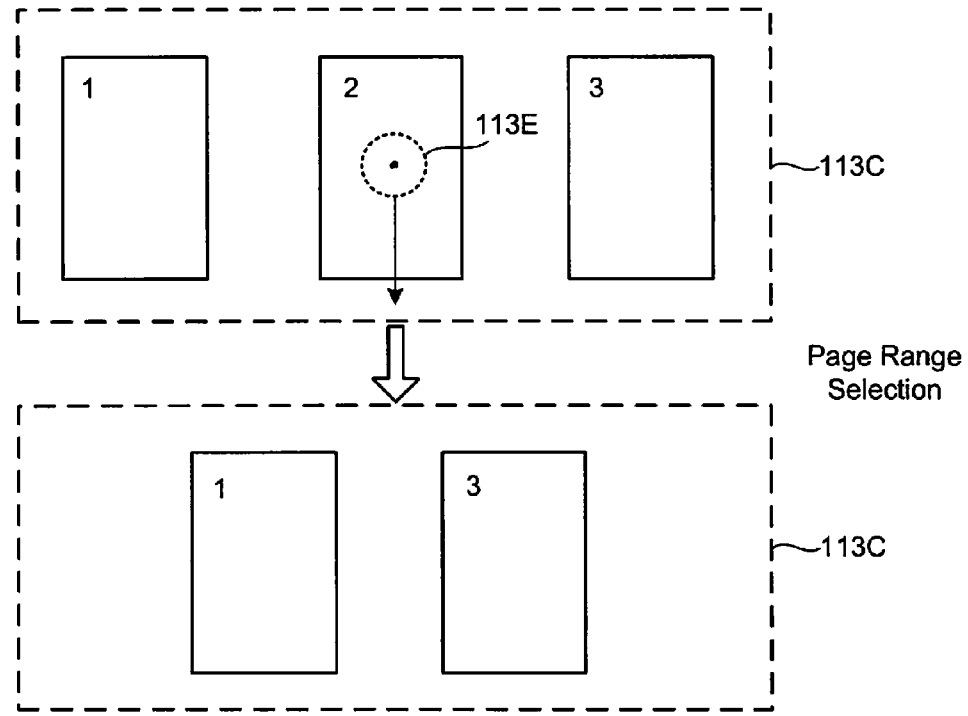
FIG. 4E illustrates a selection for changing the print preview/pseudo print preview according to another embodiment.

FIG. 4E illustrates a selection for changing the print preview/pseudo print preview according to another embodiment. The left side of FIG. 4E illustrates the print preview/pseudo print preview 113C before a selection is made. The print preview 113C of FIG. 4E may be the print preview provided by the print preview generator 129 of FIG. 1A, the pseudo print preview provided by the pseudo preview generator 131 of FIG. 1A, or the print preview provided by the print preview generator 117 of FIG. 1B. Referring to FIG. 4E, the user interface controller 111 of FIG. 1A or 1B may provide user controls on the print preview/pseudo print preview itself such as the controls 113E shown in the figure. However, although not illustrated in the figure, the controls 113E may be provided on each of the displayed pages. The controls 113E of FIG. 4E relate to the page range printing option. For example, to edit the page range (e.g., remove pages, set page ranges), the user may drag away the pages that he/she does not wish to print. As such, in this case, the user may drag away the second page, which results in the second page being omitted from the printing request. Therefore, the user interface controller 111 may receive information indicating a movement of at least one of the pages to be omitted from printing. Then, the print preview generator 129 of FIG. 1A, the pseudo preview generator 131 of FIG. 1A, or the print preview generator 117 may change the print review/pseudo print preview including generating the print preview/pseudo print preview 113C having the desired page range, which is represented on the right side of FIG. 4E.

It is noted that the examples of FIGS. 4B-4E are merely examples, where the embodiments encompass any type of variation of using interface controls directly on the print preview itself. Also, many other examples and variations of the systems and operations of FIGS. 1-4 would be apparent to one skilled in the art. For example, instead of printing to a hardware printer, the system may be used to print to PDF or other software format.

Figure 5:
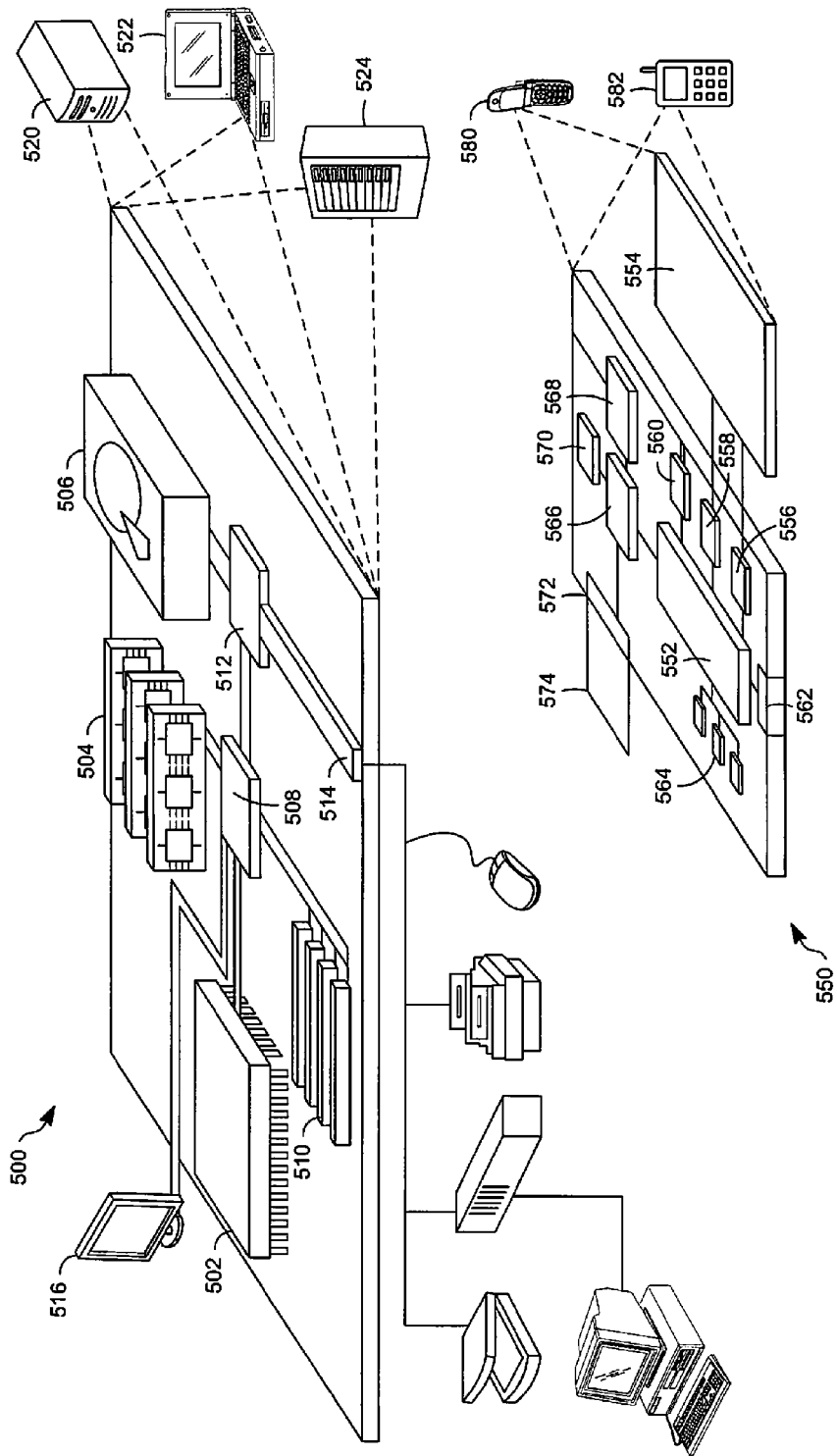
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A print server comprising:
   at least one processor;
   a non-transitory computer-readable storage medium including instructions executable by the at least one processor, the instructions configured to implement,
   an application manager configured to receive, over a network, a print request for content to be printed in accordance with at least one selected printing option from an application associated with a device, and configured to provide a print dialog, over the network, to a user of the application in response to the print request, the print dialog identifying at least one printer and providing the at least one selected printing option;

a pseudo preview generator configured to provide a pseudo print preview for display within the print dialog while a print preview is being generated, the pseudo print preview providing a generic representation of at least a portion of the content displayed in accordance with the at least one selected printing option; and a print preview generator configured to access the content in response to the print request and generate the print preview providing the at least a portion of the content displayed in accordance with the at least one selected printing option, and further configured to transmit the print preview, over the network, for display within the print dialog thereby replacing the pseudo print preview.

2. The print server of claim 1, wherein the print preview generator configured to access the content including receiving the content, over the network, from the application in response to the print request.

3. The print server of claim 1, wherein the print preview generator configured to access the content including retrieving the content from a network server in response to the print request.

4. The print server of claim 1, wherein the print preview generator configured to generate the print preview including arranging the at least a portion of the content in accordance with the at least one selected printing option below the at least one selected printing option.

5. The print server of claim 1, wherein the print preview generator is further configured to receive option adjustment information, over the network, from the application, the option adjustment information indicating an adjustment to the at least one selected printing option, and the preview generator is configured to generate the print preview including providing the at least a portion of the content displayed in accordance with the adjusted at least one selected printing option.

6. The print server of claim 5, wherein the print preview generator further includes a content storage configured to store previous print previews, and the print preview generator is configured to generate the print preview including determining that the print preview according to the adjusted at least one selected printing option is stored in the content storage and selecting the stored preview print preview having the adjusted at least one selected printing option.

7. The print server of claim 5, wherein the print preview generator further includes a content storage configured to store previous print previews, and the print preview generator configured to generate the print preview including determining that the print preview according to the adjusted at least one selected printing option is not stored in the content storage and generating the print preview based on the at least a portion of the content and the adjusted at least one selected printing option.

8. The print server of claim 1, wherein the pseudo print preview displays information indicating that the print preview is being generated.

9. The print server of claim 1, wherein, in response to receipt of an adjustment of the at least one selected printing option, the pseudo preview generator configured to provide the pseudo print preview includes replacing the print preview with the pseudo print preview and providing the pseudo print preview until the print preview having the adjusted at least one selected printing option is available.

10. A method for providing a print preview performed by at least one processor, the method comprising:

receiving, over a network, a print request for content to be printed in accordance with at least one selected printing option from an application associated with a device;

providing a print dialog, over the network, to a user of the application in response to the print request, the print dialog identifying at least one printer and providing the at least one selected printing option;

providing a pseudo print preview for display within the print dialog while a print preview is being generated, the pseudo print preview providing a generic representation of at least a portion of the content displayed in accordance with the at least one selected printing option;

accessing the content in response to the print request;

generating the print preview providing the at least a portion of the content displayed in accordance with the at least one selected printing option; and transmitting the print preview, over the network, for display within the print dialog thereby replacing the pseudo print preview.

11. The method of claim 10, wherein the assessing the content in response to the print request includes receiving the content, over the network, from the application in response to the print request.

12. The method of claim 10, wherein the accessing the content in response to the print request includes retrieving the content from a network server in response to the print request.

13. The method of claim 10, wherein the generating the print preview includes arranging the at least a portion of the content in accordance with the at least one selected printing option below the at least one selected printing option.

14. The method of claim 10, further comprising:

receiving option adjustment information, over the network, from the application, the option adjustment information indicating an adjustment to the at least one selected printing option;

generating the print preview including providing the at least a portion of the content displayed in accordance with the adjusted at least one selected printing option.

15. The method of claim 14, wherein the generating the print preview includes determining that the print preview according to the adjusted at least one selected printing option is stored in a content storage that stores previously generated print previews and selecting the stored preview print preview having the adjusted at least one selected printing option.

16. The method of claim 14, wherein the generating the print preview includes determining that the print preview according to the adjusted at least one selected printing option is not stored in a content storage that stores previously generated print previews and generating the print preview based on the at least a portion of the content and the adjusted at least one selected printing option.

17. A non-transitory computer-readable medium storing instructions that when executed cause one or more processors to perform a print preview generation process, the instructions comprising instructions to:

receive, over a network, a print request for content to be printed in accordance with at least one selected printing option from an application associated with a device;

provide a print dialog, over the network, to a user of the application in response to the print request, the print dialog identifying at least one printer and providing the at least one selected printing option;

provide a pseudo print preview for display within the print dialog while a print preview is being generated, the pseudo print preview providing a generic representation of at least a portion of the content displayed in accordance with the at least one selected printing option;

access the content in response to the print request;

generate the print preview providing the at least a portion of the content displayed in accordance with the at least one selected printing option; and transmit the print preview, over the network, for display within the print dialog thereby replacing the pseudo print preview.

18. The non-transitory computer-readable medium of claim 17, further including instructions to:

receive the content, over the network, from the application in response to the print request.

19. The non-transitory computer-readable medium of claim 17, further including instructions to:

receive option adjustment information, over the network, from the application, the option adjustment information indicating an adjustment to the at least one selected printing option;

generate the print preview including providing the at least a portion of the content displayed in accordance with the adjusted at least one selected printing option.

20. The non-transitory computer-readable medium of claim 19, further including instructions to:

determine that the print preview according to the adjusted at least one selected printing option is stored in a content storage that stores previously generated print previews; and select the stored preview print preview having the adjusted at least one selected printing option.

* * * * *